US006960840B2

(12) United States Patent
Willis et al.

(10) Patent No.: US 6,960,840 B2
(45) Date of Patent: Nov. 1, 2005

(54) INTEGRATED TURBINE POWER GENERATION SYSTEM WITH CATALYTIC REACTOR

(75) Inventors: Jeffrey W. Willis, Los Angeles, CA (US); Paul Berner, Newbury Park, CA (US); Guillermo Pont, Los Angeles, CA (US); Joel Wacknov, Thousand Oaks, CA (US)

(73) Assignee: Capstone Turbine Corporation, Chatsworth, CA (US)

( * ) Notice: Subject to any disclaimer, the term of this patent is extended or adjusted under 35 U.S.C. 154(b) by 41 days.

(21) Appl. No.: 10/706,070

(22) Filed: Nov. 13, 2003

(65) Prior Publication Data

US 2004/0100101 A1 May 27, 2004

Related U.S. Application Data

(60) Division of application No. 09/933,663, filed on Aug. 22, 2001, now abandoned, which is a continuation-in-part of application No. 09/772,537, filed on Jan. 29, 2001, now Pat. No. 6,381,944, which is a continuation of application No. 09/420,494, filed on Oct. 19, 1999, now Pat. No. 6,192,668, which is a continuation-in-part of application No. 09/207,817, filed on Dec. 8, 1998, now Pat. No. 6,487,096.

(60) Provisional application No. 60/080,457, filed on Apr. 2, 1998.

(51) Int. Cl.$^7$ .............................. H02K 9/00
(52) U.S. Cl. .................. 290/52; 290/40; 290/40 A; 290/40 B; 290/40 C; 290/54
(58) Field of Search ................ 290/52, 40, 40 A, 290/40 B, 40 C, 54

(56) References Cited

U.S. PATENT DOCUMENTS 2,285,976 A  6/1942  Huitson
2,624,172 A  1/1953  Houdry ............... 60/39.02
2,772,636 A  12/1956 Yates
2,864,244 A  12/1958 Prachar
3,124,924 A  3/1964  Smith
3,161,020 A  12/1964 LaHaye
3,250,973 A  5/1966  Dawson
3,313,103 A  4/1967  Johnson
3,396,083 A  8/1968  Chase
3,500,105 A  3/1970  Clifford (Continued)

FOREIGN PATENT DOCUMENTS

| EP | 0 472 294 | 2/1992 |
| EP | 0 679 800 | 11/1995 |
| EP | 0 837 231 | 4/1998 |
| EP | 0 901 218 | 3/1999 |
| JP | 06-108879 | * 4/1994 ............ F02C/9/18 |
| WO | WO 94/27359 | 11/1994 |
| WO | WO 98/25014 | 6/1998 |
| WO | WO 99/32762 | 7/1999 |
| WO | WO 99/52193 | 10/1999 |
| WO | WO 00/28191 | 5/2000 |

OTHER PUBLICATIONS

Japanese Patent Application entitled "Turbogenerator/Motor Control System"; filed May 13, 1999, Japanese Serial No. 133003/1999.

(Continued)

Primary Examiner—Darren Schuberg
Assistant Examiner—Iraj A. Mohandesi
(74) Attorney, Agent, or Firm—Waddey & Patterson, P.C.; Lucian Wayne Beavers

(57) ABSTRACT

The invention provides integrated turbogenerators having a turbine wheel, a compressor impeller, and a motor generator mounted to or mechanically constrained to a common shaft, and improved components and configurations thereof.

12 Claims, 13 Drawing Sheets

U.S. PATENT DOCUMENTS

| | | |
|---|---|---|
| 3,569,809 A | 3/1971 | Comer |
| 3,591,844 A | 7/1971 | Schonebeck |
| 3,623,317 A | 11/1971 | Foster-Pegg |
| 3,703,076 A | 11/1972 | Hagemeister |
| 3,724,214 A | 4/1973 | Bryant |
| 3,740,948 A | 6/1973 | Kellett |
| 3,764,815 A | 10/1973 | Habock et al. |
| 3,809,914 A | 5/1974 | Kilgore et al. |
| 3,829,758 A | 8/1974 | Studtmann |
| 3,928,961 A | 12/1975 | Pfefferle |
| 3,937,974 A | 2/1976 | Lafuze |
| 3,991,357 A | 11/1976 | Kaminski |
| 4,005,581 A | 2/1977 | Aanstad |
| 4,015,187 A | 3/1977 | Sasaki et al. |
| 4,039,804 A | 8/1977 | Reed et al. |
| 4,039,914 A | 8/1977 | Steigerwald et al. |
| 4,062,184 A | 12/1977 | Hagen |
| 4,093,869 A | 6/1978 | Hoffmann et al. |
| 4,119,861 A | 10/1978 | Gocho |
| 4,128,700 A * | 12/1978 | Sederquist .................. 429/17 |
| 4,258,424 A | 3/1981 | Giras et al. |
| 4,265,099 A | 5/1981 | Johnson et al. |
| 4,292,534 A | 9/1981 | Diegel et al. |
| 4,340,820 A | 7/1982 | Meyer-Pittroff et al. |
| 4,401,938 A | 8/1983 | Cronin |
| 4,442,385 A | 4/1984 | Van Sickle |
| 4,471,229 A | 9/1984 | Plohn et al. |
| 4,481,459 A | 11/1984 | Mehl et al. |
| 4,498,551 A | 2/1985 | Arbisi |
| 4,551,980 A | 11/1985 | Bronicki |
| 4,560,364 A | 12/1985 | Cohen |
| 4,565,957 A | 1/1986 | Gary et al. |
| 4,684,814 A | 8/1987 | Radomski |
| 4,709,318 A | 11/1987 | Gephart et al. |
| 4,719,550 A | 1/1988 | Powell et al. |
| 4,724,670 A | 2/1988 | Greer |
| 4,730,397 A | 3/1988 | Weiford et al. |
| 4,754,607 A | 7/1988 | Mackay |
| 4,757,686 A | 7/1988 | Kawamura et al. |
| 4,772,802 A | 9/1988 | Glennon et al. |
| 4,781,527 A | 11/1988 | Miller |
| 4,785,624 A | 11/1988 | Smith et al. |
| 4,786,852 A | 11/1988 | Cook |
| 4,802,882 A | 2/1989 | Heidrich |
| 4,830,412 A | 5/1989 | Raad et al. |
| 4,833,887 A | 5/1989 | Kawamura et al. |
| 4,841,216 A | 6/1989 | Okada et al. |
| 4,862,009 A | 8/1989 | King |
| 4,883,973 A | 11/1989 | Lakey et al. |
| 4,908,565 A | 3/1990 | Cook et al. |
| 4,939,441 A | 7/1990 | Dhyanchand |
| 4,955,199 A | 9/1990 | Kawamura |
| 4,967,096 A | 10/1990 | Diemer et al. |
| 4,968,926 A | 11/1990 | Dhyanchand |
| 4,982,569 A | 1/1991 | Bronicki |
| 5,013,929 A | 5/1991 | Dhyanchand |
| 5,015,941 A | 5/1991 | Dhyanchand |
| 5,029,062 A | 7/1991 | Capel |
| 5,038,566 A | 8/1991 | Hara |
| 5,055,764 A | 10/1991 | Rozman et al. |
| 5,057,763 A | 10/1991 | Torii et al. |
| 5,068,590 A | 11/1991 | Glennon et al. |
| 5,088,286 A | 2/1992 | Muraji |
| 5,097,195 A | 3/1992 | Raad et al. |
| 5,115,183 A | 5/1992 | Kyoukane et al. |
| 5,158,504 A | 10/1992 | Stocco |
| 5,191,520 A | 3/1993 | Eckersley |
| 5,214,371 A | 5/1993 | Naidu |
| 5,237,260 A | 8/1993 | Takakado et al. |
| 5,250,890 A | 10/1993 | Tanamachi et al. |
| 5,252,860 A | 10/1993 | McCarty et al. |
| 5,260,637 A | 11/1993 | Pizzi |
| 5,281,905 A | 1/1994 | Dhyanchand et al. |
| 5,291,106 A | 3/1994 | Murty et al. |
| 5,309,081 A | 5/1994 | Shah et al. |
| 5,325,043 A | 6/1994 | Parro |
| 5,345,154 A | 9/1994 | King |
| 5,363,032 A | 11/1994 | Hanson et al. |
| 5,364,309 A | 11/1994 | Heidrich et al. |
| 5,373,195 A | 12/1994 | De Doncker et al. |
| 5,381,081 A | 1/1995 | Radun |
| 5,387,859 A | 2/1995 | Murugan et al. |
| 5,404,092 A | 4/1995 | Gegner |
| 5,406,797 A | 4/1995 | Kawamura |
| 5,428,275 A | 6/1995 | Carr et al. |
| 5,430,362 A | 7/1995 | Carr et al. |
| 5,477,091 A | 12/1995 | Fiorina et al. |
| 5,488,286 A | 1/1996 | Rozman et al. |
| 5,490,376 A | 2/1996 | Van Der Burgt |
| 5,495,162 A | 2/1996 | Rozman et al. |
| 5,495,163 A | 2/1996 | Rozman et al. |
| 5,510,696 A | 4/1996 | Naidu et al. |
| 5,512,811 A | 4/1996 | Latos et al. |
| 5,544,484 A | 8/1996 | Voss et al. |
| 5,545,090 A | 8/1996 | Kirschey |
| 5,546,742 A | 8/1996 | Shekhawat et al. |
| 5,550,410 A | 8/1996 | Titus |
| 5,550,455 A | 8/1996 | Baker |
| 5,559,421 A | 9/1996 | Miyakawa |
| 5,563,802 A | 10/1996 | Plahn et al. |
| 5,568,023 A | 10/1996 | Grayer et al. |
| 5,572,108 A | 11/1996 | Windes |
| 5,581,168 A | 12/1996 | Rozman et al. |
| 5,587,647 A | 12/1996 | Bansal et al. |
| 5,594,322 A | 1/1997 | Rozman et al. |
| 5,637,987 A | 6/1997 | Fattic et al. |
| 5,646,458 A | 7/1997 | Bowyer et al. |
| 5,656,915 A | 8/1997 | Eaves |
| 5,743,227 A | 4/1998 | Jacquet et al. |
| 5,767,637 A | 6/1998 | Lansberry |
| 5,789,881 A | 8/1998 | Egami et al. |
| 5,799,484 A | 9/1998 | Nims |
| 5,819,524 A | 10/1998 | Bosley et al. |
| 5,847,522 A | 12/1998 | Barba |
| 5,865,023 A * | 2/1999 | Sorebsen .................. 60/39.02 |
| 5,903,116 A | 5/1999 | Geis et al. |
| 5,905,346 A | 5/1999 | Yamada et al. |
| 5,929,537 A | 7/1999 | Glennon |
| 5,936,312 A | 8/1999 | Koide et al. |
| 5,939,794 A | 8/1999 | Sakai et al. |
| 5,946,086 A | 8/1999 | Bruce |
| 5,982,645 A | 11/1999 | Levran et al. |
| 5,998,976 A | 12/1999 | Steffan |
| 6,003,297 A | 12/1999 | Ziener |
| 6,005,297 A | 12/1999 | Sasaki et al. |
| 6,016,658 A | 1/2000 | Willis et al. .................. 60/737 |
| 6,020,713 A | 2/2000 | Geis et al. |
| 6,023,135 A | 2/2000 | Gilbreth et al. |
| 6,031,294 A | 2/2000 | Geis et al. |
| 6,051,951 A | 4/2000 | Arai et al. |
| 6,054,776 A | 4/2000 | Sumi |
| 6,064,122 A | 5/2000 | McConnell |
| 6,087,734 A | 7/2000 | Maeda et al. |
| 6,093,975 A | 7/2000 | Peticolas |
| 6,107,693 A * | 8/2000 | Mongia ...................... 290/52 |
| 6,107,775 A | 8/2000 | Rice et al. |
| 6,141,953 A * | 11/2000 | Mongia .................. 60/39.04 |
| 6,147,414 A | 11/2000 | McConnell et al. |
| 6,153,942 A | 11/2000 | Roseman et al. |
| 6,158,892 A | 12/2000 | Stewart et al. .............. 344/108 |
| 6,169,332 B1 | 1/2001 | Taylor et al. |

| | | |
|---|---|---|
| 6,169,334 B1 | 1/2001 | Edelman |
| 6,175,210 B1 | 1/2001 | Schwartz et al. |
| 6,190,048 B1 | 2/2001 | Weissert ............... 384/103 |
| 6,192,668 B1 | 2/2001 | Mackay |
| 6,194,794 B1 | 2/2001 | Lampe et al. |
| 6,205,768 B1 | 3/2001 | Dibble et al. |
| 6,269,625 B1 * | 8/2001 | Dibble ............... 60/39.06 |
| 6,313,544 B1 * | 11/2001 | Mongia ............... 290/52 |
| 6,487,096 B1 | 11/2002 | Gilbreth et al. |
| 6,526,757 B2 | 3/2003 | Mackay |
| 6,606,864 B2 | 8/2003 | MacKay |
| 2002/0099476 A1 | 7/2002 | Hamrin et al. |

OTHER PUBLICATIONS

Japanese Patent Application entitled "Command and Control System and Method for Multiple Turbogenerators", filed Oct. 27, 1999, Japanese Serial No. 305375/1999.

Japanese Patent Application entitled "Turbogenerator/Motor Controller", filed Aug. 4, 1998, Japanese Serial No. 220231/1998.

* cited by examiner

INTEGRATED TURBINE POWER GENERATION SYSTEM WITH CATALYTIC REACTOR

CROSS-REFERENCE TO RELATED APPLICATIONS

This application is a division of U.S. patent application Ser. No. 09/933,663, filed Aug. 22, 2001 now abandoned, which is a continuation-in-part of U.S. patent application Ser. No. 09/207,817, filed Dec. 8, 1998 (now U.S. Pat. No. 6,487,096), which claims the benefit of U.S. provisional application Ser. No. 60/080,457, filed Apr. 2, 1998, and which is a continuation-in-part of U.S. patent application Ser. No. 09/772,537, filed on Jan. 29, 2001 (now U.S. Pat. No. 6,381,944), which is a continuation of U.S. patent application Ser. No. 09/420,494, filed on Oct. 19, 1999 (now U.S. Pat. No. 6,192,668), all of which are incorporated herein by reference in their entirety as set forth below in full.

BACKGROUND OF THE INVENTION

1. Field of the Invention

This invention relates to integrated turbogenerators for producing power under varying load conditions, and more specifically to the use of catalytic reactors in combination with such systems.

2. Description of the Related Art

Integrated turbogenerators have a turbine wheel, a compressor impeller, and a motor generator mounted to or mechanically constrained to a common shaft. Conventional integrated turbogenerator systems using a flame-based or catalytic primary reactor have limited efficiency, emissions problems, do not maintain a steady state operating temperature at varying loads, and have difficulty in dealing with varying load conditions.

The inventors recognized that what was needed was a turbogenerator system having high efficiency, environmentally acceptable emissions levels, an enhanced ability to maintain a steady state operating temperature at varying loads, and capability to perform well under varying load conditions.

SUMMARY OF THE INVENTION

In a first aspect, the present invention provides an energy producing apparatus comprising:

compressor mechanism for compressing air and fuel;

an energy take-off device;

turbine mechanism for driving the compressor mechanism and the energy take-off device;

a main catalytic combustor disposed between an outlet of the compressor mechanism and an inlet of the turbine mechanism for combusting the air/fuel mixture compressed by the compressor mechanism and supplying the resulting products of combustion to the turbine side for driving the turbine mechanism, the main catalytic combustor having a volume sufficient for oxidizing enough of the fuel to achieve a predetermined turbine inlet temperature, and insufficient for oxidizing all of the fuel;

a secondary catalytic combustor disposed downstream of the turbine mechanism for receiving turbine exhaust gases and combusting at least some of the fuel therein that was not combusted by the main catalytic combustor; and a heat exchanger arranged to receive turbine exhaust gases from the secondary catalytic combustor and for transferring heat therefrom to the compressed air/fuel being conducted to the main catalytic combustor, a passage extending from the turbine mechanism to the heat exchanger for conducting the exhaust gases being free of turbine mechanism.

In another aspect, the present invention provides an energy producing apparatus comprising:

an energy conversion mechanism comprising a compressor side for compressing air/fuel, and a turbine side for driving the compressor side;

an air supply conduit and a fuel supply conduit for conducting air and fuel separately into a compressor of the compressor side to be compressed and mixed therein, wherein only one stream of compressed air/fuel mixture exits the compressor side;

an electrical generator operably connected to the turbine side to be driven thereby for producing electrical energy;

a heat exchanger having a first passage for conducting the stream of compressed air/fuel mixture traveling from an outlet of the compressor side, and a second passage for conducting hot waste gas from an outlet of the turbine side in heat exchange relationship with the stream of compressed air/fuel mixture in the first passage;

a catalytic combustor disposed between an outlet of the first passage of the heat exchanger and an inlet of the turbine side for reacting compressed the air/fuel mixture received from the first passage prior to entry thereof into the turbine side; and wherein the entire compressed stream of air/fuel mixture exiting the compressor side passes through the heat exchanger, and all of the fuel entering the catalytic combustor passes first through the compressor side and the heat exchanger during steady state operation of the apparatus.

In another aspect, the present invention provides an energy producing apparatus comprising:

compressor mechanism for compressing air and fuel;

an energy take-off device;

turbine mechanism for driving the compressor mechanism and the energy take-off device;

a main combustor disposed between an outlet of the compressor mechanism and an inlet of the turbine mechanism for combusting the air/fuel mixture compressed by the compressor mechanism and supplying the resulting products of combustion to the turbine side for driving the turbine mechanism;

a secondary catalytic combustor disposed downstream of the turbine mechanism for receiving turbine exhaust gases; and a heat exchanger arranged to receive turbine exhaust gases from the secondary catalytic combustor and for transferring heat therefrom to the compressed air/fuel being conducted to the main catalytic combustor.

In another aspect, the present invention provides an energy producing apparatus comprising:

an energy conversion mechanism comprising a compressor side for compressing air/fuel, and a turbine side for driving the compressor side;

an air supply conduit and a fuel supply conduit for conducting air and fuel separately into a compressor of the compressor side to be compressed and mixed therein, wherein only one stream of compressed air/fuel mixture exits the compressor side;

an electrical generator operably connected to the turbine side to be driven thereby for producing electrical energy;

a heat exchanger having a first passage for conducting the stream of compressed air/fuel mixture traveling from an outlet of the compressor side, and a second passage for conducting hot waste gas from an outlet of the turbine side in heat exchange relationship with the stream of compressed air/fuel mixture in the first passage;

a combustor disposed between an outlet of the first passage of the heat exchanger and an inlet of the turbine side; and wherein the entire compressed stream of air/fuel mixture exiting the compressor side passes through the heat exchanger, and all of the fuel entering the combustor passes first through the compressor side and the heat exchanger during steady state operation.

In another aspect, the present invention provides an energy producing apparatus comprising:

compressor mechanism for compressing air and fuel;

an energy take-off device;

turbine mechanism for driving the compressor mechanism and the energy take-off device;

a main combustor disposed between an outlet of the compressor mechanism and an inlet of the turbine mechanism for combusting the air/fuel mixture compressed by the compressor mechanism and supplying the resulting products of combustion to the turbine side for driving the turbine mechanism, said main combustor designed to catalytically combust fuel;

a secondary catalytic combustor disposed downstream of the turbine mechanism for receiving turbine exhaust gases; and a heat exchanger arranged to receive turbine exhaust gases from the secondary catalytic combustor and for transferring heat therefrom to the compressed air/fuel being conducted to the main catalytic combustor.

In another aspect, the present invention provides an energy producing apparatus comprising:

an energy conversion mechanism comprising a compressor side for compressing air/fuel, and a turbine side for driving the compressor side;

an air supply conduit and a fuel supply conduit for conducting air and fuel separately into a compressor of the compressor side to be compressed and mixed therein, wherein only one stream of compressed air/fuel mixture exits the compressor side;

an electrical generator operably connected to the turbine side to be driven thereby for producing electrical energy;

a heat exchanger having a first passage for conducting the stream of compressed air/fuel mixture traveling from an outlet of the compressor side, and a second passage for conducting hot waste gas from an outlet of the turbine side in heat exchange relationship with the stream of compressed air/fuel mixture in the first passage;

a combustor disposed between an outlet of the first passage of the heat exchanger and an inlet of the turbine side, said combustor designed to catalytically combust fuel; and wherein the entire compressed stream of air/fuel mixture exiting the compressor side passes through the heat exchanger, and all of the fuel entering the combustor passes first through the compressor side and the heat exchanger during steady state operation.

In another aspect, the present invention provides an energy producing apparatus comprising:

compressor mechanism for compressing air and fuel;

an energy take-off device;

turbine mechanism for driving the compressor mechanism and the energy take-off device;

a main combustor disposed between an outlet of the compressor mechanism and an inlet of the turbine mechanism for combusting the air/fuel mixture compressed by the compressor mechanism and supplying the resulting products of combustion to the turbine side for driving the turbine mechanism, said main combustor designed to catalytically combust fuel;

a secondary catalytic combustor disposed downstream of the turbine mechanism for receiving turbine exhaust gases; and a heat exchanger arranged to receive turbine exhaust gases from the secondary catalytic combustor and for transferring heat therefrom to the compressed air/fuel being conducted to the main catalytic combustor; and wherein said turbine mechanism includes a turbine wheel, said energy take-off device is a motor-generator, said motor-generator includes a rotor, and said turbine wheel and said rotor are constrained to rotate together.

In another aspect, the present invention provides an energy producing apparatus comprising:

an energy conversion mechanism comprising a compressor side for compressing air/fuel, and a turbine side for driving the compressor side;

an air supply conduit and a fuel supply conduit for conducting air and fuel separately into a compressor of the compressor side to be compressed and mixed therein, wherein only one stream of compressed air/fuel mixture exits the compressor side;

an electrical generator operably connected to the turbine side to be driven thereby for producing electrical energy;

a heat exchanger having a first passage for conducting the stream of compressed air/fuel mixture traveling from an outlet of the compressor side, and a second passage for conducting hot waste gas from an outlet of the turbine side in heat exchange relationship with the stream of compressed air/fuel mixture in the first passage;

a combustor disposed between an outlet of the first passage of the heat exchanger and an inlet of the turbine side, said combustor designed to catalytically combust fuel;

wherein the entire compressed stream of air/fuel mixture exiting the compressor side passes through the heat exchanger, and all of the fuel entering the combustor passes first through the compressor side and the heat exchanger during steady state operation; and wherein said turbine side includes a turbine wheel, said electric generator includes a rotor, and said turbine wheel and said rotor are constrained to rotate together.

In another aspect, the present invention provides an energy producing apparatus comprising:

compressor mechanism for compressing air and fuel;

an energy take-off device;

turbine mechanism for driving the compressor mechanism and the energy take-off device;

a main combustor disposed between an outlet of the compressor mechanism and an inlet of the turbine mechanism for combusting the air/fuel mixture compressed by the compressor mechanism and supplying the resulting products of combustion to the turbine side for driving the turbine mechanism;

a secondary catalytic combustor disposed downstream of the turbine mechanism for receiving turbine exhaust gases;

a heat exchanger arranged to receive turbine exhaust gases from the secondary catalytic combustor and for transferring heat therefrom to the compressed air/fuel being conducted to the main catalytic combustor; and wherein said main combustor defines a substantially annular main combustion chamber having a main combustion chamber annular outer radius, said secondary catalytic combustor has a substantially annular shape and a secondary catalytic combustor inner annular radius, and said secondary catalytic combustor inner annular radius is greater than said main combustion chamber annular outer radius.

In another aspect, the present invention provides an energy producing apparatus comprising:

an energy conversion mechanism comprising a compressor side for compressing air/fuel, and a turbine side for driving the compressor side;

an air supply conduit and a fuel supply conduit for conducting air and fuel separately into a compressor of the compressor side to be compressed and mixed therein, wherein only one stream of compressed air/fuel mixture exits the compressor side;

an electrical generator operably connected to the turbine side to be driven thereby for producing electrical energy;

a heat exchanger having a first passage for conducting the stream of compressed air/fuel mixture traveling from an outlet of the compressor side, and a second passage for conducting hot waste gas from an outlet of the turbine side in heat exchange relationship with the stream of compressed air/fuel mixture in the first passage;

a combustor disposed between an outlet of the first passage of the heat exchanger and an inlet of the turbine side;

wherein the entire compressed stream of air/fuel mixture exiting the compressor side passes through the heat exchanger, and all of the fuel entering the combustor passes first through the compressor side and the heat exchanger during steady state operation; and wherein said combustor defines a substantially annular main combustion chamber.

In another aspect, the present invention provides an method of producing energy comprising the steps of:

compressing air and fuel using a compressor mechanism;

taking of energy using an energy take-off device;

driving the compressor mechanism and the energy take-off device using a turbine mechanism;

combusting the air/fuel mixture compressed by the compressor mechanism and supplying the resulting products of combustion to the turbine side for driving the turbine mechanism using a main combustor disposed between an outlet of the compressor mechanism and an inlet of the turbine mechanism;

receiving turbine exhaust gases using a secondary catalytic combustor disposed downstream of the turbine mechanism;

receiving turbine exhaust gases from the secondary catalytic combustor and transferring heat therefrom to the compressed air/fuel being conducted to the main catalytic combustor using a heat exchanger; and wherein said main combustor defines a substantially annular main combustion chamber having a main combustion chamber annular outer radius, said secondary catalytic combustor has a substantially annular shape and a secondary catalytic combustor inner annular radius, and said secondary catalytic combustor inner annular radius is greater than said main combustion chamber annular outer radius.

In another aspect, the present invention provides an method of producing energy comprising the steps of:

compressing air/fuel, and a turbine side for driving the compressor side using an energy conversion mechanism comprising a compressor side;

conducting air and fuel separately into a compressor of the compressor side to be compressed and mixed therein, wherein only one stream of compressed air/fuel mixture exits the compressor side;

producing electrical energy using in an electrical generator operably connected to and driven by the turbine side;

conducting hot waste gas from an outlet of the turbine side in heat exchange relationship with the stream of compressed air/fuel mixture in a first passage, in a heat exchanger;

combusting fuel in a combustor disposed between an outlet of the first passage of the heat exchanger and an inlet of the turbine side;

wherein the entire compressed stream of air/fuel mixture exiting the compressor side passes through the heat exchanger, and all of the fuel entering the combustor passes first through the compressor side and the heat exchanger during steady state operation; and wherein said combustor defines a substantially annular main combustion chamber.

In another aspect, the present invention provides a turbogenerator system, comprising:

a turbine;

a compressor;

a motor/generator;

a common shaft on which the turbine, compressor and motor/generator are mounted for rotation;

a primary combustor downstream of said compressor, said primary combustor having an exhaust gas outlet applied to the turbine to rotate the common shaft, the compressor and motor/generator;

a source of fuel for providing fuel to the primary combustor;

a catalytic reactor downstream of said turbine for reducing unburned hydrocarbons in said exhaust gases;

a recuperator for transferring heat from said exhaust gases to compressed gas applied by said compressor to said primary combustor;

a DC bus connected between said motor/generator and a load; and a power controller for independently controlling the speed of said common shaft, an operating temperature of said turbogenerator and the voltage on said DC bus.

In another aspect, the present invention provides a turbogenerator system, comprising:

a turbine;

a compressor;

a motor/generator;

a common shaft on which the turbine, compressor and motor/generator are mounted for rotation;

a primary combustor downstream of said compressor, said primary combustor having an exhaust gas outlet applied to the turbine to rotate the common shaft, the compressor and motor/generator;

a source of fuel for providing fuel to the primary combustor;

a catalytic reactor downstream of said turbine for reducing unburned hydrocarbons in said exhaust gases; and a recuperator for transferring heat from said exhaust gases to compressed gas applied by said compressor to said primary combustor.

In another aspect, the present invention provides a method of operating a turbogenerator system, comprising the steps of:

increasing gas temperature by compressing it in a compressor;

further increasing temperature of said gas in a heat exchanger downstream of said compressor;

further increasing temperature of said gas by converting chemical energy to heat in a catalytic reactor downstream of the heat exchanger;

reducing the temperature of said gas by flowing it through a turbine;

increasing the temperature of the gas downstream of said turbine by converting chemical energy to heat in a second catalytic reactor; and decreasing temperature of said gas by flowing said gas through a heat exchanger downstream of said second catalytic converter.

These and other features and advantages of this invention will become further apparent from the detailed description and accompanying figures that follow. In the figures and description, numerals indicate the various features of the invention, like numerals referring to like features throughout both the drawings and the description.

BRIEF DESCRIPTION OF THE DRAWINGS

Further advantages of the invention will become apparent from the following description and claims, and from the accompanying drawings wherein:

DESCRIPTION OF THE PREFERRED EMBODIMENT(S)

Figure 1:
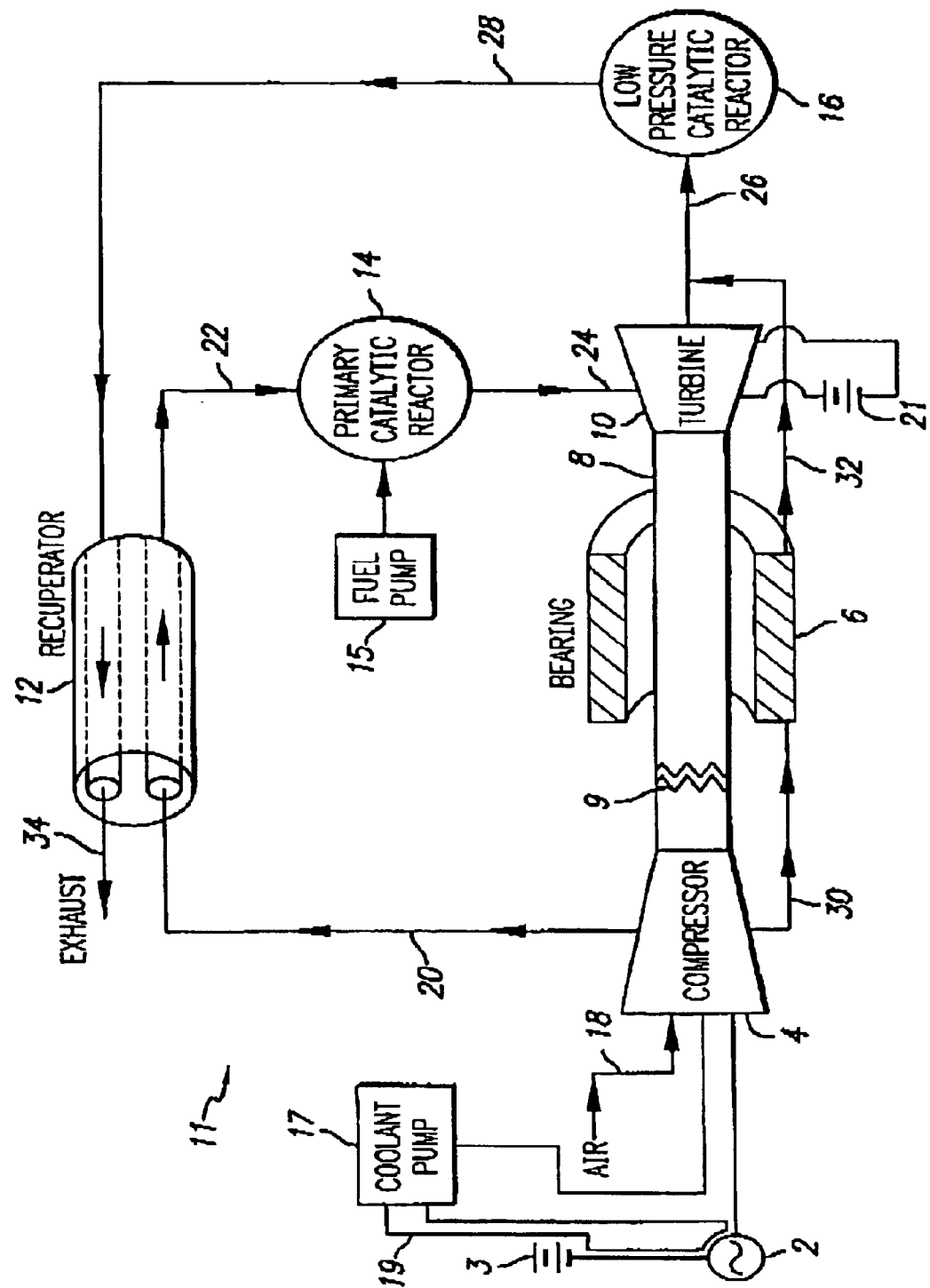
FIG. 1 is a block diagram illustration of a turbogenerator system of an exemplary embodiment.

FIG. 1 illustrates a preferred integrated turbine power generation system in block diagram form. The system 11 is useful for many applications including cogeneration and as a power source for vehicles. System 11 preferably converts chemical energy, from fuels such as natural gas or gasoline, into mechanical power, electrical power and/or thermal energy. One preferred embodiment of system 11 includes a compressor 4 for compressing gas entering system 11 through line 18. The gas entering through line 18 can be air, or alternatively can be air mixed with fuel. Compressor 4 causes the gas to flow along line 20 to, and through, a heat exchanger, preferably a recuperator 12. As discussed in further detail below, the gas is heated during its passage through the recuperator 12, ideally by counter flowing heated exhaust gas that enters recuperator 12 along line 28 as the gas approaches its exit to system 11 through line 34. Once heated, the compressed gas flows onward along line 22 into primary catalytic reactor 14. In some embodiments fuel is pumped, typically under pressure generated by fuel pump 15 directly into the primary catalytic reactor 14 where it is combined with the compressed pre-heated gas from line 22. Fuel pump 15 can be a compressor, such as a rotary fuel compressor, for injecting natural gas. The presence of the catalyst in primary catalytic reactor 14 causes the fuel to react exothermically, releasing thermal energy, heating the flowing gas as well as the surrounding primary catalytic reactor 14. The gas stream then preferably flows out of primary catalytic reactor 14 along line 24 and is expanded through a turbine 10, lowering its temperature and pressure and causing the rotation of a common shaft 8. Common shaft 8 is connected, indirectly or directly, to the rotary portion of turbine 10 and may also be connected to other system components. In some embodiments, for example, compressor 4 draws mechanical force or torque from common shaft 8. Common shaft 8 may be made of multiple pieces connected by joints 9. Common shaft 8 may be supported by radial air bearings 6, as discussed in further detail below.

The power captured by turbine 10 can be transferred to one or more energy take-off devices, including a high-speed electrical generator 2 that converts rotational mechanical energy from turbine 10 into electricity. Part of the electrical energy generated in the generator 2 may be applied toward operation of system 11 itself, such as for use in operating compressor 4, fuel pump 15, or a coolant pump 17 that may be used in the system. Generator 2 is preferably maintained at an acceptably cool temperature during operation. In some embodiments, generator 2 is positioned as far as possible from the primary heat sources in system 11, such as primary catalytic reactor 14. Alternatively, or in addition, cool air or another coolant can be caused to flow by coolant pump 17 along coolant line 19 in proximity to generator 2 to reduce its temperature. Battery 3 is connected to, and may transfer electrical power to and from generator 2.

Mechanical energy from turbine 10 can be used to mechanically power other devices. In addition, the heat generated by system 11 can be used for heating and to produce additional electrical or mechanical energy. For example, the heated gas exiting recuperator 12 could be used to heat or boil water. A steam-powered electric generator could be used to recapture some of the remaining energy present in the exhaust gas in line 34 of system 11.

As described below, additional enhancements can be made to system 11 to increase its efficiency, reduce emissions, and enhance the ability of system 11 to complete the startup process and begin steady state operation within operational constraints.

Low Pressure Catalytic Reactor

The portion of the gas flow path after the turbine is referred to herein as the low pressure loop. The inclusion of low pressure catalytic reactor 16 in the low pressure loop of system 11 is helpful in overcoming longstanding problems affecting integrated turbogenerator systems. Moreover, inclusion of low pressure catalytic reactor 16 in the low pressure loop of system 11 makes available a considerable number of heretofore unappreciated advantages. Low pressure catalytic reactor 16 is sometimes referred to as a secondary catalytic reactor. Including low pressure catalytic reactor 16 leads in system 11 to enhanced efficiency as well as cleaner and faster startup within the unique size, cost and complexity constraints of a commercially acceptable integrated turbogenerator system. Inclusion of low pressure catalytic reactor 16 in system 11 increases the fraction of hydrocarbon based fuels's chemically stored energy that is converted into thermal energy. In addition, low pressure catalytic reactor 16 permits system 11 to have acceptably efficient operation when primary catalytic reactor 14 is at a temperature below primary catalytic converter 14's "light-off" temperature. The "light-off" temperature is the temperature under operating conditions at which self sustaining catalytic reaction initiates, and those conditions may include the gas flow rate, fuel to air ratio, and pressure. Once primary catalytic reactor 14 reaches its light-off temperature, low pressure catalytic reactor 16 continues to enhance conversion efficiency. The inclusion of low pressure catalytic converter 16 reduces the requirements for the amount of catalyst needed in the primary catalytic reactor 14, which actually can reduce the total amount of catalyst a system. Use of low pressure catalytic reactor 16 in some embodiments additionally permits operation at lower temperatures than comparable flame-based reactors, resulting in lower levels of environmentally undesirable NOx gases, permitting the use of lower-cost materials for reactor fabrication. One embodiment of the present invention provides a system that produces approximately 30 to 60 kilowatts, with efficiency comparable to that of large-scale systems. Currently preferred systems provide power in the range of up to 100 kilowatts. Calculations show this type of system is useful up to about one megawatt.

Also of importance is the tradeoff between pressure drop caused by the existence of the low pressure catalytic reactor 16 and the fuel conversion efficiency or efficiency of the low pressure catalytic reactor in avoiding undesirable emissions. There is a tradeoff between conversion efficiency of low pressure catalytic converter 16 and pressure drop across low pressure catalytic converter 16. The conversion efficiency of low pressure catalytic converter 16 depends upon the interaction of gas flowing through it with catalyst on surfaces of the converter. Increasing this interaction requires increasing catalytic surface area of the converter and path length of the gas flow in the converter, which increases resistance to flow, which increases pressure drop across the converter, which decreases the power generated by an upstream turbine due to increased pressure downstream of the turbine. Preferably, system 11 is designed to have low pressure catalytic converter having a relatively large inlet cross sectional area, since relatively large inlet cross sectional area provides relatively low pressure in the gas flow, and relatively low pressure in gas flow through the catalytic converter provides a relatively small pressure drop across the catalytic converter. Thus, a desired conversion efficiency and an acceptably small pressure loss can be achieved by providing a catalytic converter having sufficiently large inlet cross section in order to provide a sufficiently small inlet pressure to provide a pressure loss across the converter below a specified value. Preferably, low pressure catalytic converter 16 converts at least about seventy percent, preferably at least about eighty percent, more preferably at least eighty five percent, and most preferably at least ninety percent of the unreacted hydrocarbons passing through it. These conversion efficiencies occur preferably when low pressure catalytic converter in conjunction with primary catalytic combustor 14. More preferably, combined operation of primary catalytic combustor 14 above its light-off temperature and low pressure catalytic converter 16 above its light off temperature provide conversion of at least about ninety nine percent, and more preferably at least ninety nine and one half percent, and most preferably at least ninety nine point nine percent of hydrocarbon fuel entering primary catalytic combustor 14. Moreover, preferably, low pressure catalytic combustor 16 is designed to provide these conversion efficiencies while having a pressure drop across it of no more than about 0.5 pounds per square inch, more preferably no more than about 0.1 pounds per square inch. Preferably, system 11 provides these conversion efficiencies and pressure drops across low pressure catalytic reactor 16 while operating at turbine speeds in excess of 50,000 revolutions per minute (rpm), preferably in the range of 70,000 to 100,000 rpm. In one preferred embodiment of system 11, it produces between 10 and 30 kilowatts of electrical power when operating in the range of 70,000 to 90,000 rpm, and having low pressure catalytic converter providing at least about eighty five percent conversion of unreacted fuel flowing through low pressure catalytic converter 16, and providing pressure drops across low pressure catalytic reactor 16 in the range of 0.01 to 0.1 pounds per square inch, and having a cross sectional inlet area of the catalytic reactor of between about 70 and 130 square inches. When cross-sectional area was only about 20 square inches, surge back through the compressor occurred. Cross sectional area of the catalytic converter that maintains the same pressure drop across the converter for a given conversion efficiency should scale to the power of system 11. Accordingly, cross sectional area of the inlet for low pressure catalytic converter 16 for a 100 kilowatt maximum electrical power output system should be at least 66 square inches and preferably in the range of about 230 to about 430 square inches, cross sectional area of the inlet for low pressure catalytic converter 16 for a 200 kilowatt system should be at least 132 square inches and preferably in the range of about 460 to about 860 square inches, and cross sectional area of the inlet for low pressure catalytic converter 16 for a 1000 kilowatt system should be no less than 660 square inches and preferably in the range of about 2300 to about 4300 square inches. Thus, cross sectional area of low pressure catalytic reactor 16 is no less than 0.6 square inches per each kilowatt of the maximum power output of a turbogenerator of this invention, and preferred cross sectional area of low pressure catalytic converter 16 is between about 2 and 5 square centimeters per each kilowatt of the maximum power output of a turbogenerator of this invention. In one embodiment discussed below, sufficiently large cross sectional areas of low pressure catalytic converter 16 are achieved by forming low pressure catalytic converter 16 in a generally annular shape that either encircles or is at least of a greater diameter than a generally annularly shaped primary catalytic reactor 14.

Referring still to FIG. 1, the gas exiting the turbine 10 is conveyed along line 26 to low pressure catalytic reactor 16. Much or all of the unburned hydrocarbons remaining in the gas stream at this point are reacted in low pressure reactor 16, releasing additional thermal energy and further heating the gas as well as its surroundings, including low pressure catalytic reactor 16 itself. The thermal energy released in low pressure catalytic reactor 16 may be captured and used by other parts of system 11. Low pressure catalytic reactor 16 is particularly useful in combination with a heat exchanger positioned downstream of turbine 10. In the embodiment diagrammed in FIG. 1, recuperator 12 is situated between primary catalytic reactor 14 and low pressure catalytic reactor 16 so that relatively hot gases from outlet of low pressure catalytic reactor 16 counter flow against, and transfer thermal energy to, relatively cool gases flowing from line 20 to line 22 toward the primary catalytic reactor. Specifically, the heated gas exiting low pressure catalytic reactor 16 flows along line 28 until it enters recuperator 12, wherein it heats the gas flowing in the opposite direction towards the primary catalytic reactor 14, before exiting the system through line 34.

Placement of Low Pressure Reactor

In the above-described configuration, recuperator 12 provides transfer of heat resulting from fuel conversion in low pressure catalytic reactor 16 to the gas flowing into primary catalytic reactor 14. The transfer of this heat increases the inlet temperature of primary catalytic reactor 14 and thereby increases primary catalytic reactor 14's conversion efficiency. The use of low pressure catalytic reactor 16 to heat the inflow to primary catalytic reactor 14 reduces the extent to which it may be necessary to drain power generated within other parts of system 11 and redirect it for that purpose. In addition, by increasing the efficiency of the primary catalytic reactor 14 in this manner it is possible to reduce the size of primary catalytic reactor 14 and the amount of catalyst required in that reactor. The capture of additional energy in the low pressure catalytic reactor 16 further raises the temperature of that reactor and surrounding components of system 11 and thereby reduces parasitic heat losses to the other portions of system 11. The increased efficiency of system 11 also reduces the quantity of fuel required to sustain its operation at a given power output. Furthermore, the reaction of fuel entering low pressure catalytic reactor 16 reduces the amount of fuel in the gases exhausted from line 34, thus reducing the unfavorable environmental impact of system 11.

Placement in some embodiments of recuperator 12 downstream of low pressure catalytic reactor 16 is advantageous because it permits low pressure catalytic reactor 16 to operate at a higher temperature than it would if placed after recuperator 12. At this higher temperature, conversion of initial fuel to exhaust gases and concurrent release of heat in low pressure catalytic reactor 16 is more efficient, resulting in fewer unburned hydrocarbons in exhaust line 34, increased efficiency of system 11, and lower catalyst requirements for low pressure catalytic reactor 16 itself.

Start Using Low Pressure Reactor

A system startup process is usually conducted with the objective of heating the primary catalyst to its operating temperature in the shortest time possible, without overheating and with low hydrocarbon and NOx emissions. Preferably, full power is not removed through turbine 10 until the startup sequence has concluded. Indeed, during the initial stages of startup, power can be applied to turbine 10 to start its rotation and commence air flow through system 11. Power used for initial rotation of turbine 10 during startup may be derived from battery 21 interconnected with turbine 10. During steady state operation, power from the turbine may be used to recharge battery 21. During parts of the startup process, power from turbine 10 can furthermore be recycled for heating the system 11, thus expediting the startup process. The incorporation of a low pressure catalytic reactor into an integrated turbogenerator system is exceptionally advantageous during startup.

Referring still to FIG. 1, system 11 is often in a cold state at the initiation of a startup cycle. Primary catalytic reactor 14 must usually be heated past a light-off temperature before it is capable of effectively converting fuel. In some embodiments, low pressure catalytic converter 16 can remove hydrocarbons and undesired reaction byproducts from the exhaust of primary catalytic reactor 14 before primary catalytic reactor 14 reaches its light-off temperature. During startup, a heat source as described below heats low pressure catalytic reactor 14 near its operating temperature. Furthermore, during startup, thermal energy from low pressure catalytic reactor 16 can be used to heat primary catalytic reactor 14. In some embodiments, low pressure catalytic reactor 16 is the only means used to heat primary catalytic reactor 14 to a target temperature, which target temperature is either the primary catalytic reactor 14 light-off temperature or temperature above that temperature. Startup can also be facilitated through the use of supplemental reactive or electrical heating sources at most points within the system, as discussed below.

Use of Low Pressure Reactor with Radial Air Bearings

Referring still to FIG. 1, the use of low pressure catalytic reactor 16 is also especially beneficial in combination with air bearings 6, preferably radial air bearings. Exemplary air bearing apparatus, and related matter, is described in U.S. Pat. Nos. 6,190,048 and 6,158,892, the entire contents of which are incorporated herein by this reference.

Preferably, two to three percent of the air entering the system through line 18 is diverted along line 30 for operation and cooling of the air bearings 6. This diverted air thereafter flows along line 32 and is recombined with gas exiting turbine 10 at line 26, upstream of low pressure catalytic reactor 16. Alternatively, fuel (or a fuel mixture) is injected into line 30 to flow past and cool air bearings 6. In embodiments in which fuel flows past and cools air bearings 6, the fuel entering line 26 is subsequently beneficially reacted by low pressure catalytic reactor 16 prior to exhausting from system 11. Combining low pressure catalytic reactor 16 and fuel or fuel mixture cooling of air bearings 6 can further enhance efficiency and minimize undesired emissions of unburned fuel.

Alternatively, line 32 connects from air bearings 6 to a point in the fuel flow along line 20, recuperator 12, line 22, so that the air, fuel mixture, or fuel flowing past and cooling air bearings 6 is returned to a point upstream of primary catalytic reactor 14 to subsequently flow through primary catalytic reactor 14. Preferably, in this alternative, the line 32 connects from air bearings 6 to line 20.

Air/Fuel Mixing

Figure 2:
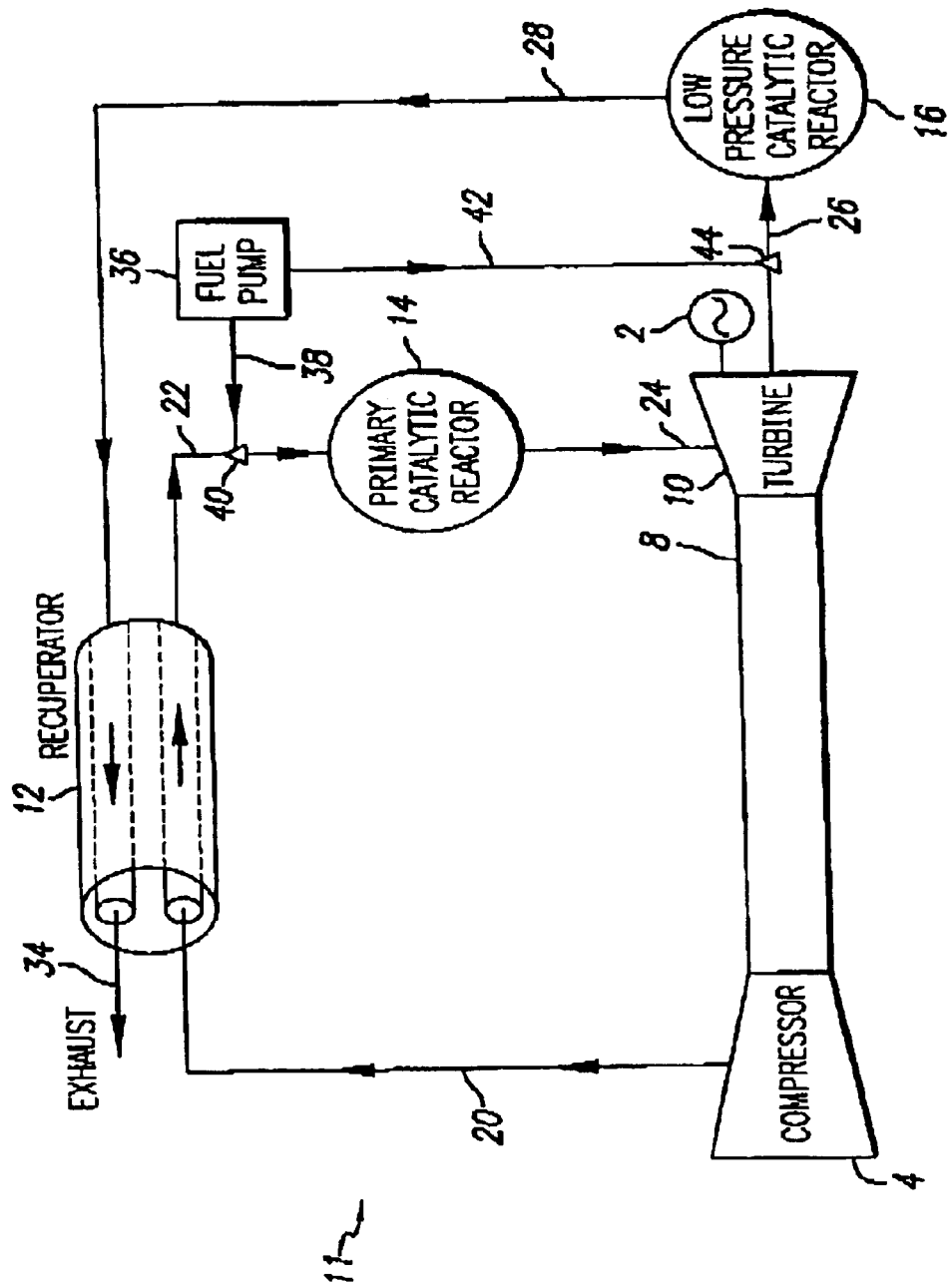
FIG. 2 is a block diagram illustration of a fuel injection arrangement for an alternate exemplary embodiment.

Referring now to FIG. 2, injection of fuel in system 11 can occur at many points. Liquid or gaseous fuel is injected by fuel pump 36, along line 38, through computer-controlled valve 40, into line 22. Alternatively, fuel pump 36 injects fuel directly into primary catalytic reactor 14.

In addition, fuel pump 36 injects liquid or gaseous fuel along line 42 through valve 44 into line 26. Valve 44 may be computer-controlled. Alternatively, fuel pump 36 may drive fuel along a direct line into low pressure catalytic reactor 16. Fuel pump 36 may be driven by common shaft 8 or by a separate power source. System 11 can operate with many types of fuel, including liquid fuels such as gasoline and gaseous fuels such as natural gas. Liquid fuel is preferably injected into system 11 (1) at a point where the temperature and pressure combination is above the condensation point of the liquid fuel and (2) at a point where the temperature and pressure of the fuel will not drop below the condensation point prior to entering a reaction chamber. An exemplary fuel injection mechanism, and related matter, is described in U.S. Pat. No. 6,016,658, the entire teachings of which are incorporated herein by this reference.

One preferred startup technique is to use a heat source to heat low pressure catalytic reactor 16 near its operating temperature, then inject fuel from fuel pump 36 directly into low pressure catalytic reactor 16 until a predetermined target temperature is achieved that corresponds to the light-off temperature of primary catalytic reactor 14, at which time fuel injection directly into low pressure catalytic reactor 16 is terminated and fuel supply to primary catalytic reactor 14 is initiated. Under some circumstances it is desirable to inject fuel simultaneously into both primary catalytic reactor 14 and low pressure catalytic reactor 16, while at other times it is preferred to inject fuel only into primary catalytic reactor 14 or only into low pressure catalytic reactor 16.

Many of the dangers posed by liquid fuel are not present with gaseous fuel. Gaseous fuel can be introduced upstream of the compressor and, if necessary, the compressor could serve to premix the gas with air. One type of gas compressor which can be integral with a turbine for power generation is further described in U.S. Pat. No. 6,192,668, the entire teachings of which are incorporated herein by this reference.

Figure 3:
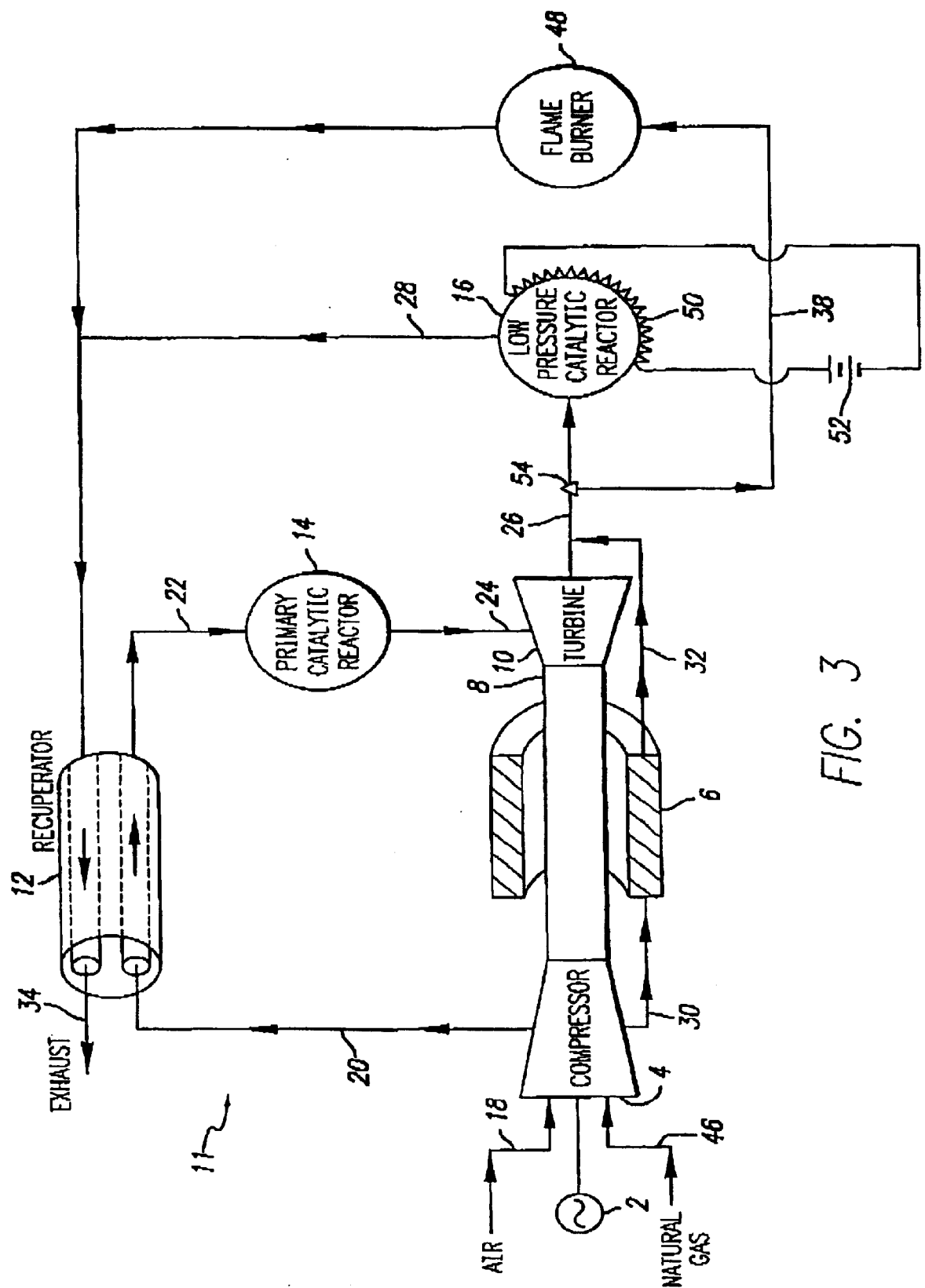
FIGS. 3, 3A and 3B are block diagram illustrations of alternate exemplary integrated turbogenerator systems having low pressure catalytic heating.

Referring now to FIG. 3, natural gas fuel, for example, is conducted along line 46, injected into compressor 4, and then flows along line 20 together with compressed air that entered compressor 4 through separate line 18. Thus, the air and fuel may be conducted into compressor 4 separately using an air inlet line 18 for conducting air into compressor 4 and a separate fuel inlet line 46 for conducting fuel into compressor 4. In embodiments in which compressor 4 is used to mix the fuel with the air, these two components may alternatively be introduced upstream of compressor 4 and conducted into compressor 4 together in a single line.

Figure 9:
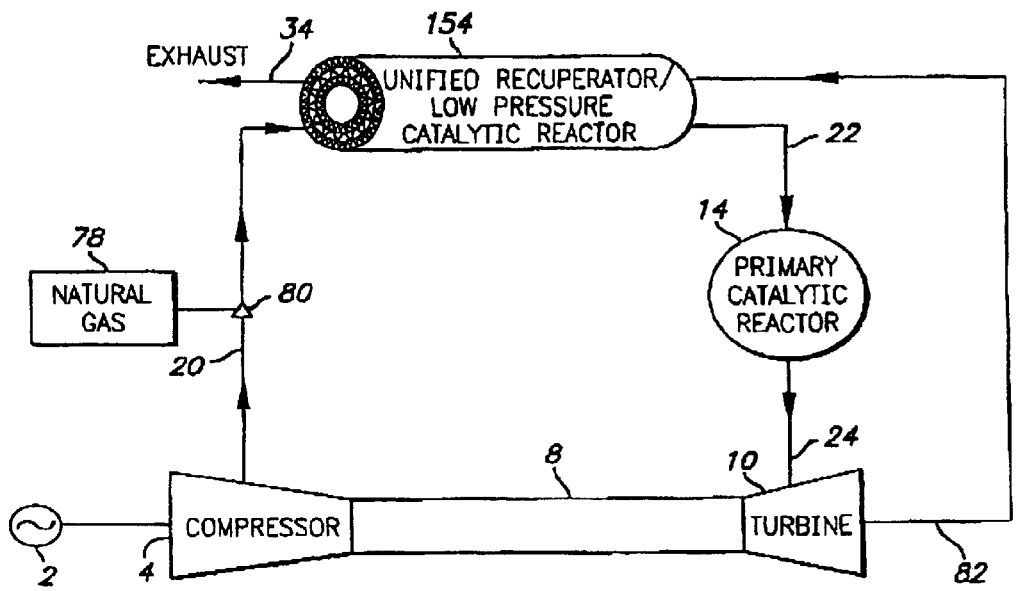
FIG. 9 is a block diagram illustration of an alternate exemplary integrated turbogenerator system having a unified recuperator and low pressure catalytic reactor.

Alternatively, as illustrated in FIG. 9, fuel can be injected from a fuel source 78, such as a natural gas fuel source, through valve 80, into the section of line 20 between the valve 80 and recuperator 154. Valve 80 may be computer-controlled.

Returning to FIG. 3, still another alternative is to inject fuel into system 11 at line 24, which is between primary catalytic reactor 14 and turbine 10. Additionally, during some operational periods, such as early in a startup cycle when the catalyst in primary catalytic reactor 14 has not reached the fuel's light-off temperature, it is desirable with some system embodiments to inject fuel either directly into low pressure catalytic reactor 16 or between turbine 10 and low pressure catalytic reactor 16.

Tertiary Heating Components

Referring still to FIG. 3, it illustrates tertiary components for facilitating system startup. Flame-based burner 48, resistive electric heater 50, or a combination of the two, can be used to expedite warming of the catalyst in primary catalytic reactor 14 to its light-off temperature while simultaneously minimizing the exhaust of unconverted fuel. Resistive electric heater 50 driven by battery 52 is disposed around low pressure catalytic reactor 16, while flame-based burner 48 is situated in parallel to low pressure catalytic reactor 16. Either one or more resistive heaters or flame burners or combinations of both may alternatively be positioned in locations including in or around recuperator 12, primary catalytic reactor 14 or low pressure catalytic reactor 16. During startup the tertiary heat source can be used to directly warm the catalyst in the low pressure reactor, the catalyst in the primary reactor, or both catalysts. The concurrent use of low pressure catalytic reactor 16 in combination with resistive electric heater 50 during startup can reduce the amount of electricity consumed during startup and accordingly reduce the requirements for battery 52 used in stand alone systems (i.e., systems designed to not need to connect to ane electric power grid).

Low pressure catalytic reactor 16 is preferably used during part or all of start up as well as during steady state operation, but for particular applications may also be employed only during selected portions of these times. In some embodiments, flame-based burner 48 and/or resistive electric heater 50 are also used during steady state operation.

Positioning of Flame Burner

Referring now to FIG. 3, it illustrates one preferred positioning of flame-based burner 48 in parallel with low pressure catalytic reactor 16 is illustrated. In this embodiment, the gas exiting turbine 10 flows along line 26 to valve 54. Valve 54 may be electronically controlled to divert flow from line 26 to line 38, towards flame-based burner 48, located in parallel with low pressure catalytic reactor 16. Part or all of the gas on line 26 may be redirected to flame-based burner 48 at desired times during startup or steady state operation. In one preferred embodiment, most or all of the gas exiting turbine 10 is diverted to flame-based burner 48 in the initial stages of startup. Once the gas exiting turbine 10 nears or reaches low pressure catalytic reactor 16's light-off temperature, valve 54 is actuated to redirect most or all of gas exiting turbine 10 to low pressure catalytic reactor 16. Then, once primary catalytic reactor 14 reaches its light-off temperature, all flow to flame-based burner 48, including any injection of fuel into inlet line 38 to flame-based burner 48, or into flame-based burner 48 itself, is terminated.

Figure 3A:
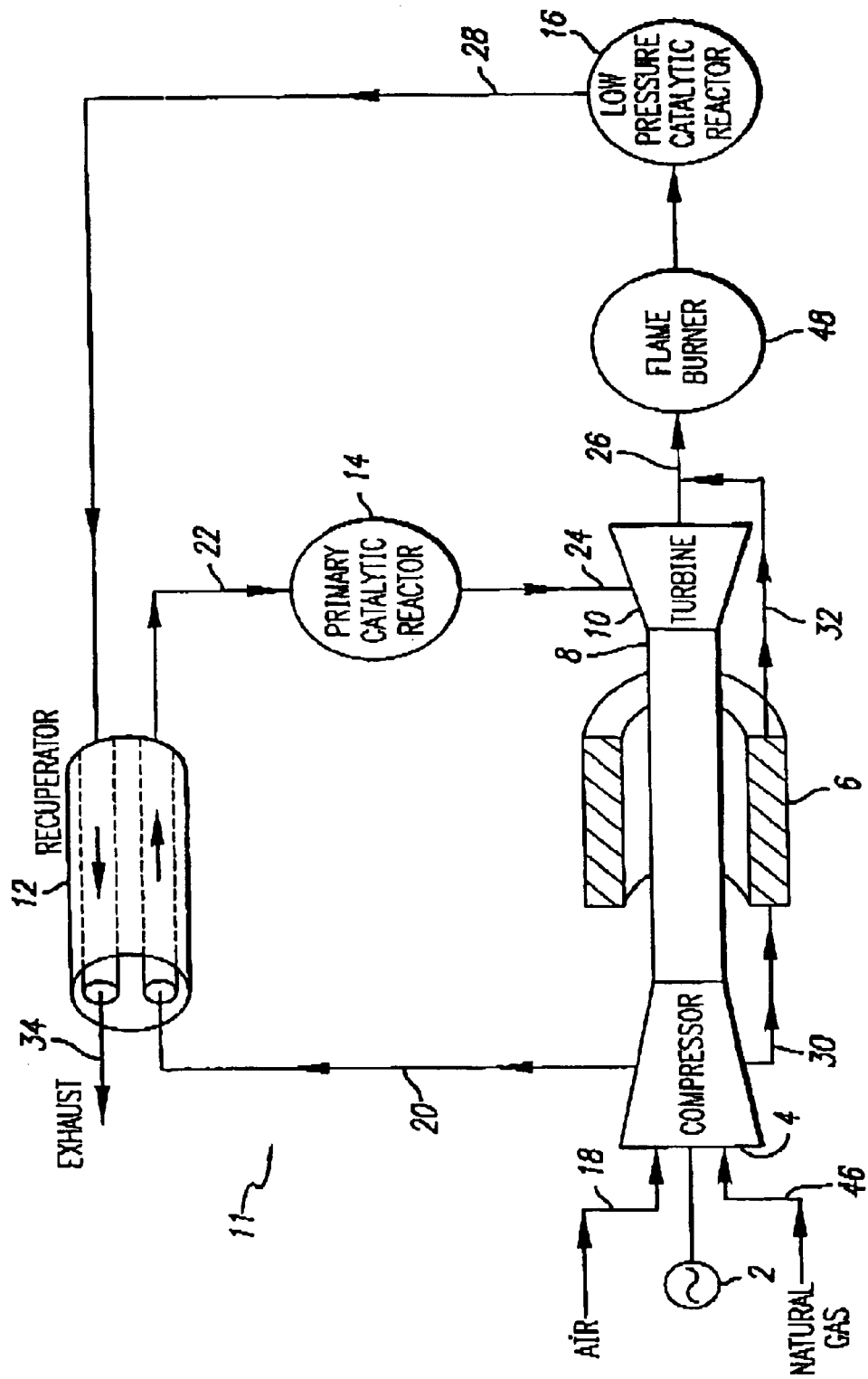
Figure 3B:
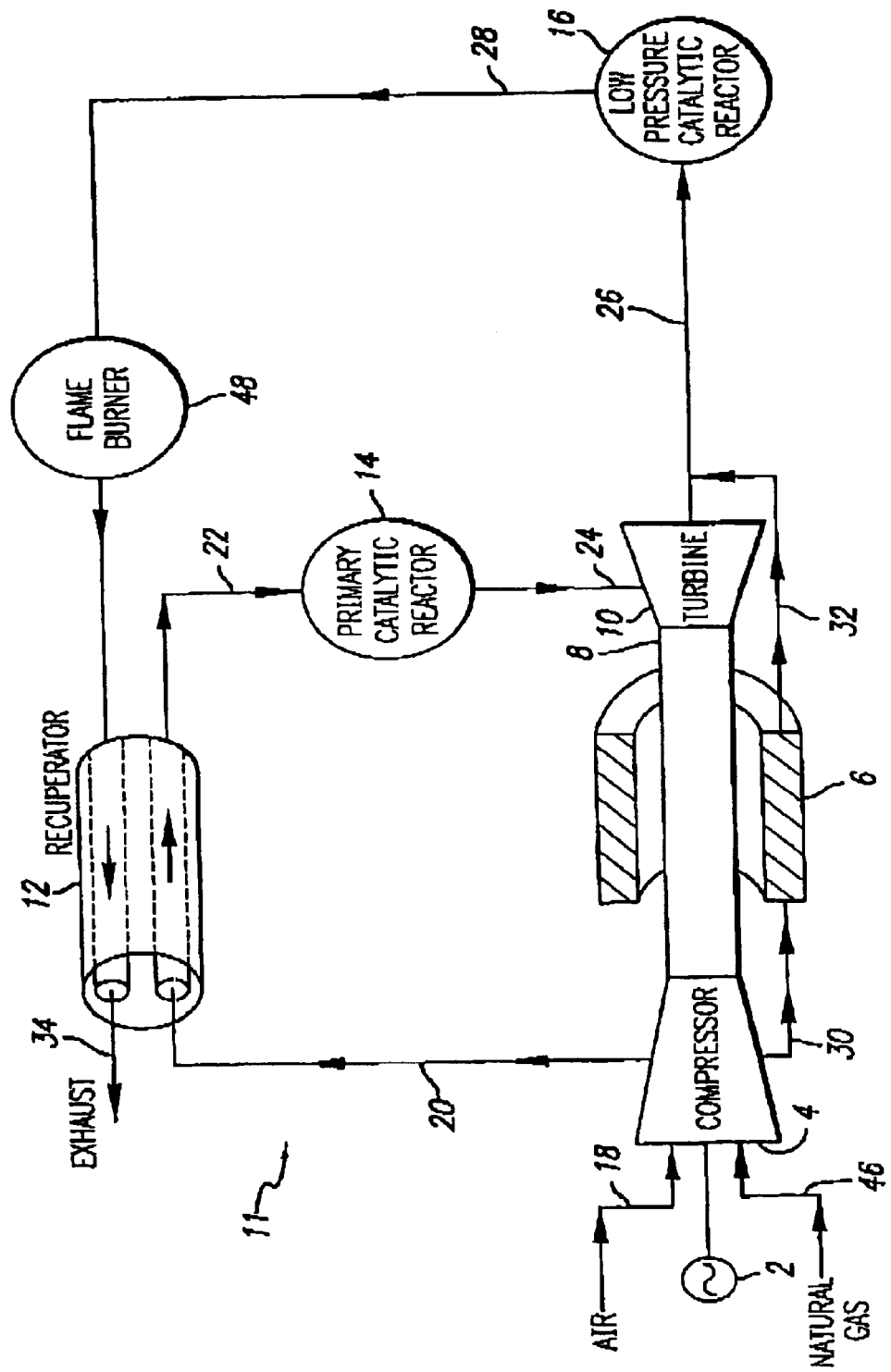

Flame-based burner 48 could also advantageously be positioned in series with low pressure catalytic reactor 16. Preferably, an in-line flame burner would be located between the outlet of turbine 10 and the inlet of low pressure catalytic reactor 16, as illustrated in FIG. 3A, or between the outlet of low pressure catalytic reactor 16 and the inlet to the hot side of recuperator 12, as illustrated in FIG. 3B. Flame burner 48 is particularly useful for providing heating and cleanup of hydrocarbons in the system exhaust during startup, especially before the light-off temperature of the catalytic reactor having the lowest light-off temperature is reached.

Startup Sequence with Tertiary Heating

Figure 4:
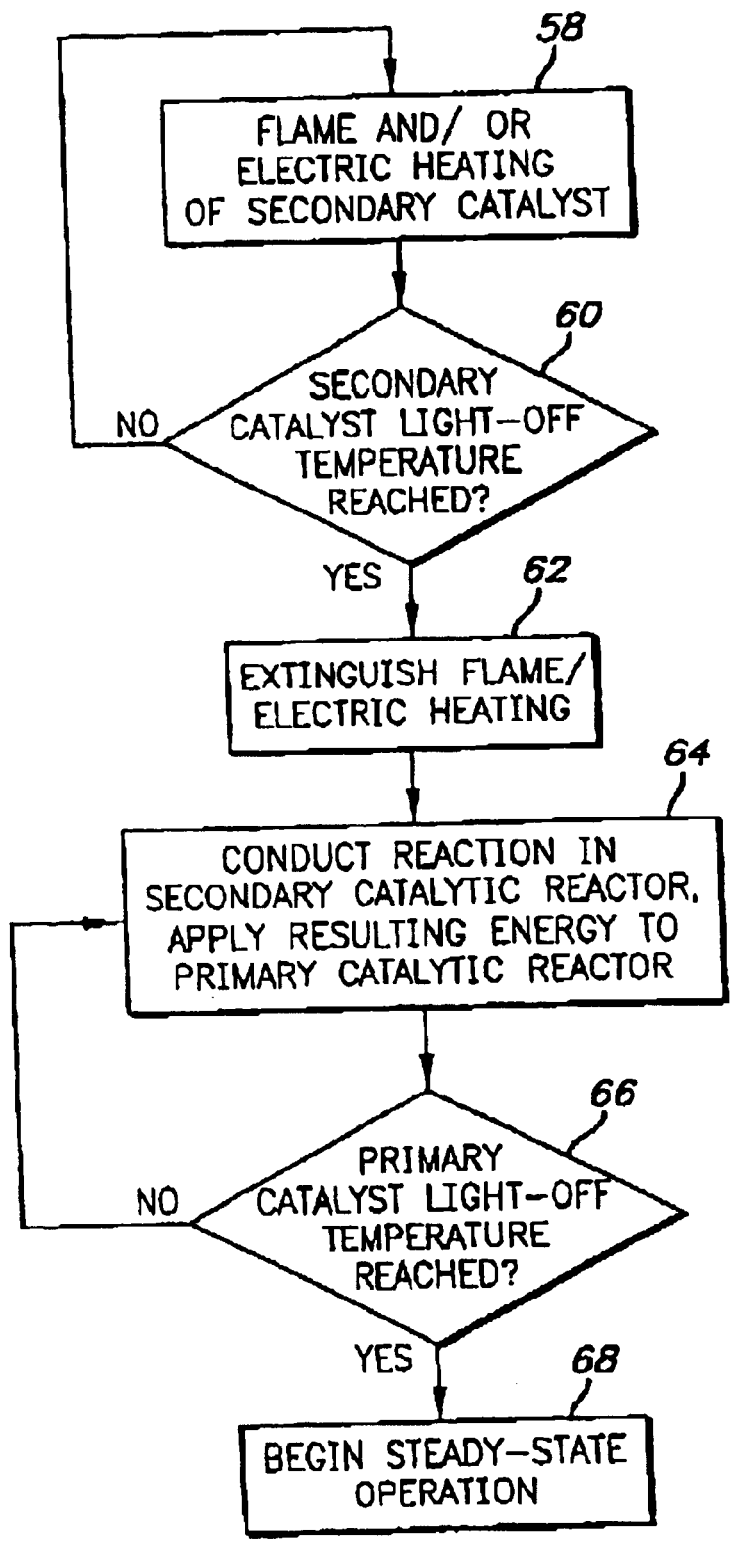
FIG. 4 is a flow chart illustrating a startup procedure employed in an exemplary embodiment.

Referring now to FIG. 4, it illustrates a preferred startup sequence for a system having tertiary heating is illustrated. This sequence may be computer controlled. First, flame and/or electric heating is used to heat the catalyst in the low pressure catalytic reactor 16 to its light-off temperature or another predetermined target temperature (step 58). The predetermined target temperature may be a measure of the gas temperature at any point in the system, such as in line 22, or it could be the temperature of a component of the system, such as the primary catalytic reactor 14. Once the low pressure reactor reaches its light-off temperature or another target temperature (step 60), the supplemental flame and/or electric heating may be turned off (step 62). Low pressure catalytic reactor 16 operates to generate thermal energy, which is used to heat primary catalytic reactor 14 (step 64) via energy transfer occurring as a result of counter flowing hot and cold gas in a recuperator. When primary catalytic reactor 14 reaches its light-off temperature or another predetermined target temperature (step 66), low pressure catalytic reactor 16 could be shut down but, preferably for most applications, steady state operation begins and the two catalytic reactors 14 and 16 continue to operate together (step 68). Preferably, the target temperatures are at or above the respective light-off temperatures.

Temperature Constraints

Although various temperature relationships are possible throughout the system, optimal efficiency may be obtained by maintaining desired relationships between the temperatures and pressures at selected points in the system. Turbogenerator system 11 is preferably designed to enable the conversion of fuel to occur near the highest temperatures permitted by the material limitations of system 11. System 11 can be designed to operate, for example, at a temperature between approximately 100° F. to 200° F. below the melting point of the system components having a melting point closest to the temperature reached by that component during system operation. In one preferred embodiment, system 11 is designed to operate at a temperature limited by the material limitations of the wheel of turbine 10. In systems having a turbine 10 constructed of stainless steel or nickel-based alloys, it is usually important to ensure that the turbine inlet temperature remains well below 2400° F., the temperature around which most steel and nickel-based metals melt. In another preferred embodiment, the peak system operating temperature is determined by the material limitations of primary catalytic reactor 14.

Environmental emissions regulations place another constraint on system 11's operating temperature. One particularly troublesome byproduct of relatively high temperature hydrocarbon conversion is NOx. In one preferred embodiment, the maximum system operating temperature is set sufficiently low that environmental NOx emissions limitations are not exceeded during system operation. In an alternate embodiment, the maximum operating temperature is set at a predetermined number of degrees below the temperature above which NOx emissions would exceed environmental restrictions during system operation.

Figure 5:
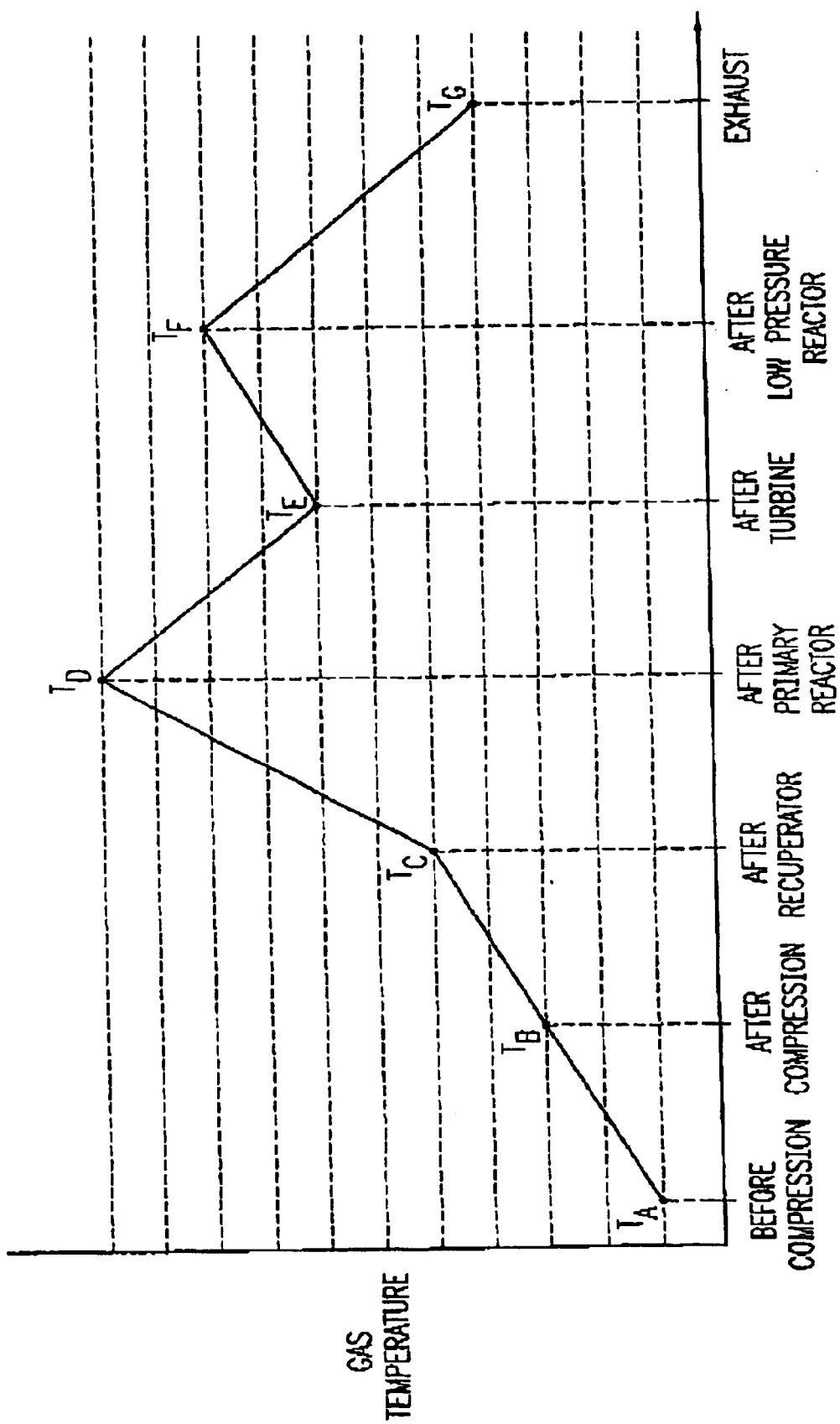
FIG. 5 is a diagram illustrating the relative gas temperatures at various points in the system in an exemplary embodiment.

Referring now to FIG. 5, it illustrates the relative temperatures at various points in one embodiment. Preferably, the temperature of the gas flowing through system 11, as illustrated in FIG. 1, is higher in line 18 and line 20 following compression. Thus $T_A$ is higher than $T_B$. The temperature increases further between line 20 and 22, and then increases even further, to its highest point within the system, following reaction in primary catalytic reactor 14. Thus, the temperature in line 24, exiting primary catalytic reactor 14, is significantly higher than the temperature in line 22, entering that reactor. As illustrated, $T_C$ is higher than $T_B$ and $T_D$ exceeds $T_C$. Due to expansion through turbine 10, the gas cools and its pressure drops. Hence, the temperature and pressure of the gas in line 24 entering the turbine is materially higher than the temperature and pressure of the gas in line 26 entering low pressure catalytic reactor 16. Thus, $T_D$ is higher than $T_E$. The temperature of the gas increases in the low pressure catalytic reactor 16 as a consequence of the conversion, in that reactor, of fuel remaining in the gas stream. Accordingly, $T_F$ exceeds $T_E$. The temperature in line 28, entering recuperator 12, is higher than the temperature in line 26, entering low pressure catalytic reactor 16. In recuperator 12, thermal energy is transferred from the gas exiting low pressure catalytic reactor 16 to the gas exiting the compressor 4. Thus, the temperature of the gas exiting low pressure catalytic reactor 16 in line 28 is higher than the temperature of the gas exiting recuperator 12 in line 34. In addition, and the temperature of the gas exiting low pressure catalytic reactor 16 in line 28 exceeds that of the gas exiting compressor 4 in line 20. $T_G$ is therefore higher than $T_A$.

In one preferred embodiment, the temperature of the gas entering the primary catalytic reactor 14 in line 22 is higher than the temperature of the gas entering the low pressure catalytic reactor 16 in line 26 ($T_C > T_E$), but the temperature of the gas exiting primary catalytic reactor 14 in line 24 is higher than the temperature of the gas exiting low pressure catalytic reactor 16 in line 28 ($T_E > T_F$).

In one embodiment, the temperature of the gas exiting recuperator 12 and flowing towards primary catalytic reactor 14 is between approximately 900° F. and 1100° F., the temperature of the gas exiting primary catalytic reactor 14 and entering turbine 10 is between approximately 1400° F. and 1800° F., the temperature of the gas exiting turbine 10 and entering low pressure catalytic reactor 16 is between approximately 800° F. and 1200° F., and the temperature of the gas exiting low pressure catalytic reactor 16 and entering recuperator 12 is between approximately 1000° F. and 1600° F. In these temperature ranges and using a recuperated cycle, compressor 4 preferably compresses the gas entering the portion of the gas flow path between the compressor and the turbine, which is referred to herein as the high pressure loop of system 11 with a compression ratio between approximately 1:3 and 1:6. In embodiments where primary catalytic reactor 14 is in the high pressure loop and low pressure catalytic reactor 16 is in the low pressure loop, the pressure in primary catalytic reactor 14 is preferably in the range of approximately three to six atmospheres, while the pressure in the low pressure catalytic reactor 16 is approximately one to one and a half atmospheres.

Figure 6:
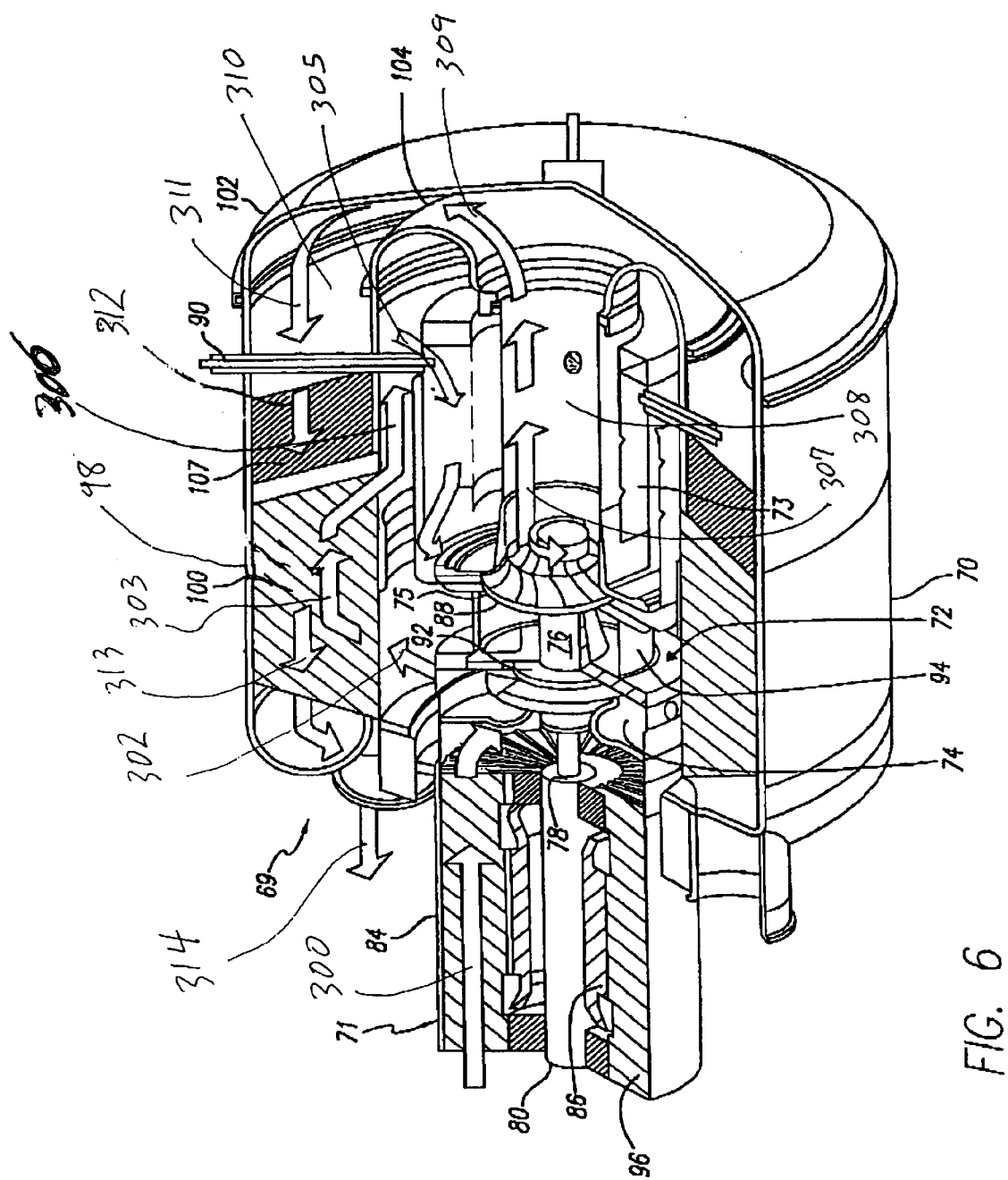
FIG. 6 is perspective view, partially in section, of a turbogenerator system for use with an annular recuperator according to an exemplary embodiment.

With reference to FIG. 6, a turbogenerator 69 suitable for use with an annular recuperator (or other form of heat exchanger) 70 according to the present invention generally includes a permanent magnet generator 71, a power head 72, and a combustor 73.

Power head 72 of turbogenerator 69 includes a compressor 74, a turbine 75, and a bearing rotor 76. A tie rod 78 mechanically ties to permanent magnet rotor 80 of generator 71 and passes through bearing rotor 76.

Permanent magnet generator 71 includes a permanent magnet rotor or sleeve 80. Permanent magnet rotor or sleeve 80 contains a permanent magnet. Permanent magnet rotor or sleeve 80 and the permanent magnet disposed therein are rotatably supported within permanent magnet generator stator 86 preferably by a pair of spaced journal bearings (not shown). Outer cylindrical sleeve 84 encloses a plurality of radial permanent magnet stator cooling fins 96 to form an annular air flow passage for cooling stator 86, with air flowing through the annular flow passage. That air, which is preheated by heat in stator cooling fins 96, flows to compressor 74, as shown by flow arrow 300.

Compressor 74 includes a compressor impeller or wheel that receives preheated air flowing from an annular air flow passage in an outer cylindrical sleeve 84 around stator 86 of generator 71 as shown by flow arrow 300. Compressor 74 forces compressed into recuperator 70, as shown by flow arrows 302, 303. The compressor wheel and turbine wheel 88 are supported on a bearing shaft or rotor 76. Bearing shaft or rotor 76 has a radially extending bearing rotor constrained by bearing rotor thrust disk 92. Bearing rotor 76 is rotatably supported preferably by a single journal bearing (not shown) within a center bearing housing 94. Bearing rotor thrust disk 92 at the compressor end of bearing rotor 76 is rotatably supported preferably by a bilateral thrust bearing (not shown).

Combustor 73 has a combustor dome 104. Combustor 73 receives preheated air flowing from recuperator 70, as shown by flow arrows 304, 305. Combustor 73 may receive fuel through a plurality of fuel injectors 90. Fuel reacts in combustor 73 generating heat. Hot gas from combustor 73 presses on turbine wheel 88 as the gas flows past turbine wheel 88, as shown by flow arrows 306, 307. The gas pressure on turbine wheel 88 urges turbine wheel 88 to rotate. Turbine wheel 88 is mechanically constrained to the impeller of the compressor and permanent magnet rotor or sleeve 80 so that the impeller of the compressor and permanent magnet rotor or sleeve 80 rotate along with turbine wheel 88.

Hot gas exiting turbine wheel 88 flows initially axially along passage 308. Passage 308 is generally cylindrical and confined within the annularly shaped combustor 73. After passing to the end of passage 308 shown at the right side of the figure, further axial flow is prevented by gas dome 102. At this point, hot gas flows generally radially outward from the axis of the power head to an annular passage 310, as shown by flow arrow 309. Annular passage 310 is radially further away from the axis of the power head than both the combustor 73 and the passage containing the gas flow indicated by flow arrows 304, 305. Gas flow proceeds in annular passage 310 in a generally axial direction, as indicate by flow arrow 311 to annular low pressure catalytic reactor 107. Gas flows through annular low pressure catalytic converter 107 into recuperator 70, as shown by flow arrows 312, 313, and then exhausts turbogenerator 69 at shown by flow arrow 314.

In turbogenerator 69, geometry providing the low pressure catalytic converter exterior to annular combustor 73 advantageously provides a relatively large cross section for gas flow inside catalytic converter.

In a typical method of operation of turbogenerator 69, air is drawn through the air flow passage in permanent magnet generator 71 by compressor 74, compressed, and directed to flow into recuperator 70. Recuperator 70 includes an annular housing 98 with a heat transfer section 100. Exhaust heat from turbine 74 is used to preheat the compressed gas flowing through recuperator 70 towards combustor 73. The gas may be mixed with fuel (or additional fuel) in the primary catalytic reactor where it is combusted or otherwise reacted. The fuel may also be premixed with all or a portion of the preheated air prior to injection into combustor 73, as illustrated schematically in other embodiments herein. The resulting combustion gas expands in turbine 75 to drive turbine wheel 88 and thus, through common or a mechanically linked bearing rotor shaft 76, the compressor's impeller and permanent magnet rotor 80. Gas exhausting from turbine 75 flows through annular low pressure catalytic reactor 107, and then flows into recuperator 70, and thereafter discharges from turbogenerator 69.

With continued reference to FIG. 6, recuperator 70 receives, channels, and transfers heat from a hot fluid stream 312 (comprised of the turbine exhaust gas) to a cold fluid stream 303 (comprised of the compressed air from the compressor). Ideally, recuperator 70 maximizes the thermal transfer of the two streams while keeping the streams physically separate and also minimizing the flow resistance encountered by the two streams to minimize pressure drop.

Annular recuperator 70 is preferably positioned to surround the other system components that are intended to operate at higher temperatures to minimize heat escape from the those components. In some embodiments, system 11 including recuperator 70 is arranged in an annular configuration, with recuperator and the low pressure catalytic reactor 107 each forming an annulus having substantially the same radii, as shown in FIG. 6. Ideally, recuperator 70 will substantially or entirely surround every significant heat-producing part of system 11, including low pressure catalytic reactor 107 and combustor 73. If system 11's components are contained in a six-sided rectangular enclosure, recuperator 70 optimally surrounds the components on at least four or five sides of that enclosure.

Alternatively, the combustor is a catalytic combustor, and the fluid flowing from compressor 74 through recuperator 70 to the catalytic combustor is a fuel mixture, such as described in connection with other figures herein. Thus, the structural configuration of elements shown in FIG. 6 corresponds to the structure configuration of elements in embodiments of the present invention involving two catalytic reactors, preheating of fuel, and a turbine.

In one embodiment, second catalytic converter 16 is placed outside of annular recuperator 70. This configuration facilitates the addition of second catalytic converter 16 to a system in which all of the other components are contained within annular recuperator 70. Alternatively, second catalytic converter 16 may be placed near the outside of an embodiment of system 11 having an annular configuration, which external placement allows second catalytic converter 16 to be designed to have a sufficiently large internal volume (e.g., compared to volume inside primary catalytic converter 14) to provide efficient conversion of fuel. In one embodiment, system 11 forms in an annular configuration having annular recuperator 70 positioned on the outside of and adjacent low pressure catalytic converter 16.

Other embodiments use a rotary recuperator type of heat exchanger, sometimes referred to as a roto-cell recuperator. Rotary recuperators, however, have moving parts and therefore tend to have more sealing problems than counter flow recuperators.

Annular recuperator 70 may employ a plurality of low temperature, high pressure "cold" cells disposed adjacent to high temperature, low pressure "hot" cells in an alternating pattern repeated over the entire diameter of the core of recuperator 70.

Figure 7:
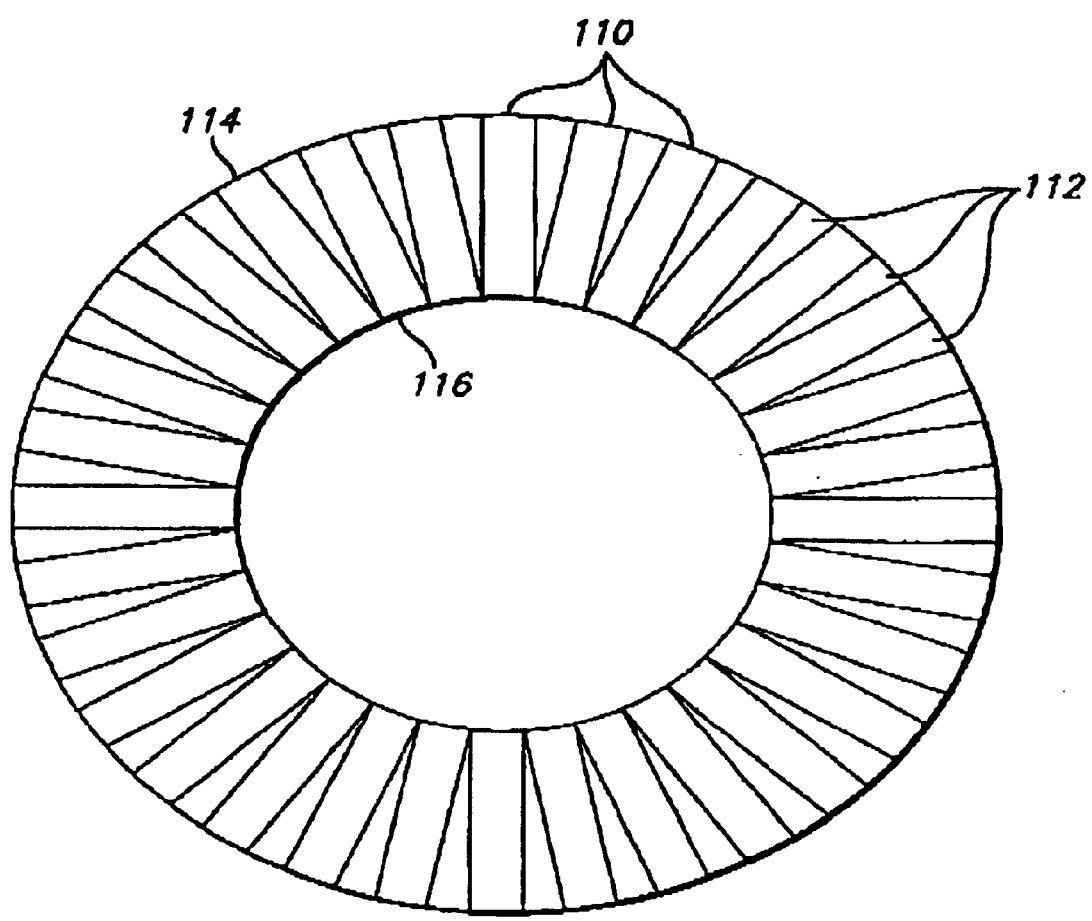
FIG. 7 is a diagram showing in cross section the spacing and placement of cold and hot cells in an annular recuperator according to an exemplary embodiment.

Referring now to FIG. 7, it shows a section of annular recuperator 70 including alternating cold cells 110 and hot cells 112. Each one of cold cells 110 and hot cells 112 have two effective heat-transfer surfaces in contact with effective heat transfer surfaces of two counter-flowing cells. In a typical configuration, hot cells 112 form flow channels defined by walls forming effective heat transfer surfaces of neighboring cold cells 110, the wall of inner diameter 116, and the wall of outer diameter 114 of annular recuperator 70. Typically, cold cells 110 are formed with a generally rectangular cross section and thereby hot cells 112 are defined with a more tapered, trapezoidal or even triangular shape due to the circular cross section of recuperator 70.

Provided the temperature in recuperator 70 does not exceed approximately 1300° F., cold cells 110 and hot cells 112 are ideally constructed of type 347 stainless steel. The application of a catalytic coating such as platinum or palladium over the recuperator core, as discussed in detail below, can increase the permissible operating temperature of recuperator 70 and can help avoid the need to construct the recuperator core from more costly materials. At higher temperatures and without catalytic coating, recuperator 70 would preferably be constructed of Hastelloy-X or Haynes-230 type alloys. The walls of cold cells 110 and hot cells 112 are preferably corrugated to increase their surface area-to-volume ratio.

Figure 8:
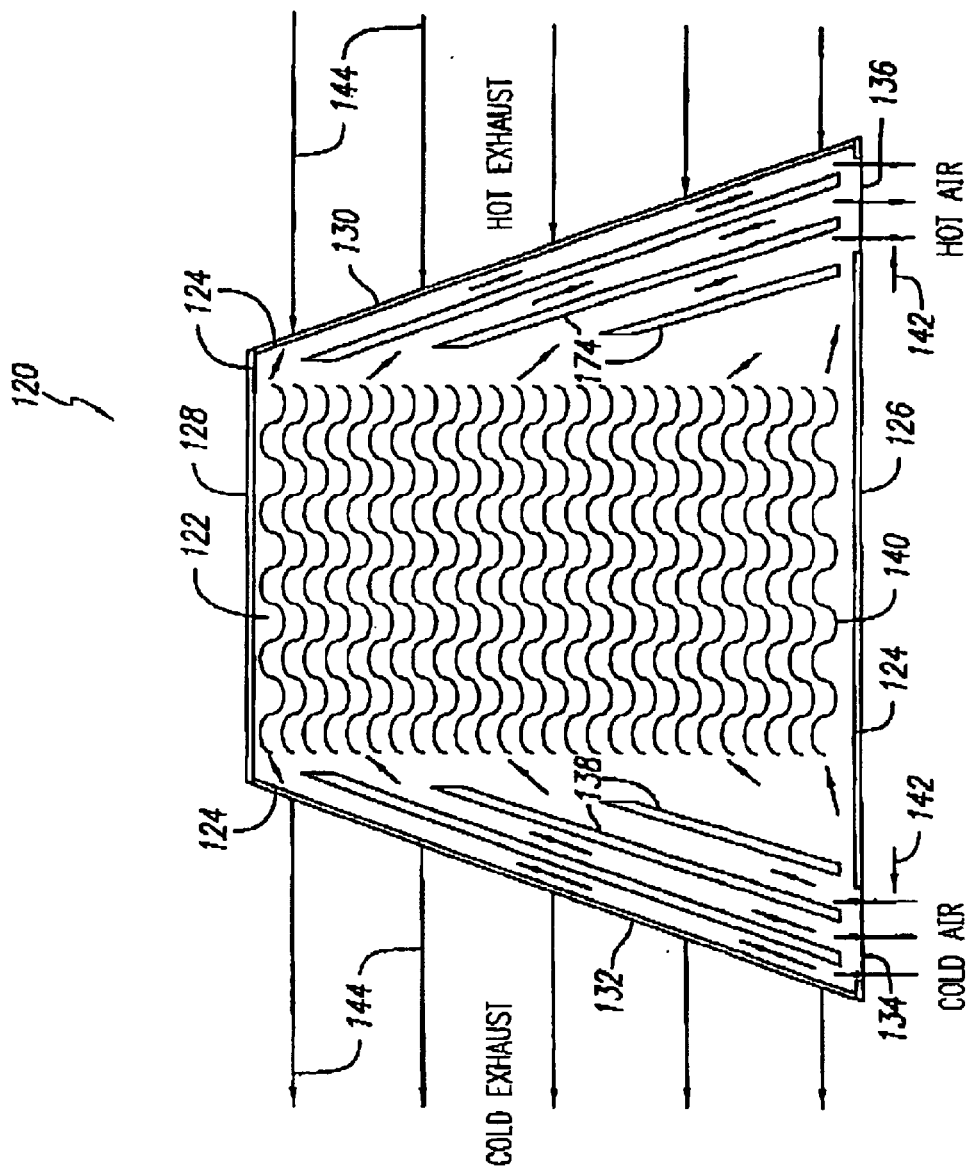
FIG. 8 is a sectional side view of a recuperator high-pressure cell of an exemplary embodiment.

With reference now to FIG. 8, recuperator 70 may include a high-pressure cell 120. The high pressure cell 120 includes a heat transfer surface 122 spaced apart from any other heat transfer surface (not shown for clarity and to illustrate the inner elements of the cell) by a lip 124 extending along the entire perimeter of the heat transfer surface 122. Cell 120 has a generally trapezoidal shape defined by a longer inner edge 126, a shorter outer edge 128, and angled edges 130 and 132 extending between the inner and outer edges. Lip 124 is interrupted at the two opposite ends of the inner edge 126 to form air inlet 134 and air outlet 136.

Cool compressed air enters air inlet 134, is heated while flowing along the axial length of cell 120, and exits as hot air through outlet 136. To encourage the even distribution of air flow, flow channels are defined within cell 120, including preferably generally radially extending channels 138 and preferably generally axially extending convolute channels 140. The purpose of the generally radially extending channels 138 is to radially distribute air flow between inner edge 126 and outer edge 128. Convolute channels 140 are designed to maximize thermal intermixing of the compressed air 142 with the counter-flowing exhaust gas 144. Angled edges 130 and 132 serve to direct the flow of air and minimize turbulence by decreasing the severity (i.e. the angle) of change in direction that the flowing air must take after entering inlet 134 and prior to exiting through outlet 136.

Reactor Structure

Primary catalytic reactor 14 and low pressure catalytic reactor 16 may be independent, self-contained pieces of equipment. They may be physically located among or encapsulated within the other components of system 11, or can be positioned outside of those components.

Low pressure catalytic reactor 16 is preferably fabricated from a substrate such as corrugated metal foil or sheets, metal screens or a ceramic material. The substrate is coated with a washcoat of catalytic material such as platinum or palladium. The substrate may be wound around an annular core. To maximize conversion efficiency, the substrate will ideally have as much surface area as possible. This maximizes the amount of catalyst that can be deposited on the substrate as well as the area of contact between the catalyst and the gases flowing through the catalytic reactor.

Primary catalytic reactor 14 preferably reaches higher operating temperatures than low pressure catalytic reactor 16, and is therefore preferably constructed from temperature-resistant castable nickel superalloy materials such as Hastelloy-X or Hanes-230 type alloys. For similar reasons, nickel superalloys such as INCO-718 or MAR-M247 are preferable for constructing portions of the turbine exposed to particularly high temperature.

Integration of Reactor and Recuperator

Referring now to FIG. 9, it illustrates an embodiment in which a low pressure catalytic reactor is integrated with other components of system 11. Low pressure catalytic reactor 16 may be combined with a recuperator either by coating all or a portion of the recuperator core itself with catalytic coating or by adding catalytic pellets, resulting in a unified recuperator/low pressure catalytic reactor 154. The catalytic pellets, may be a ceramic carrier coated with catalytic material. This unified recuperator/low pressure catalytic reactor 154 is preferably connected to the outlet of turbine 10 by line 82. Unified recuperator/reactor 154 performs a dual role. The catalyst in recuperator/reactor 154 oxidizes fuel that was not oxidized in the primary reaction chamber. It also heats the air and fuel, if any, being conducted to the primary catalytic reactor.

Figure 10:
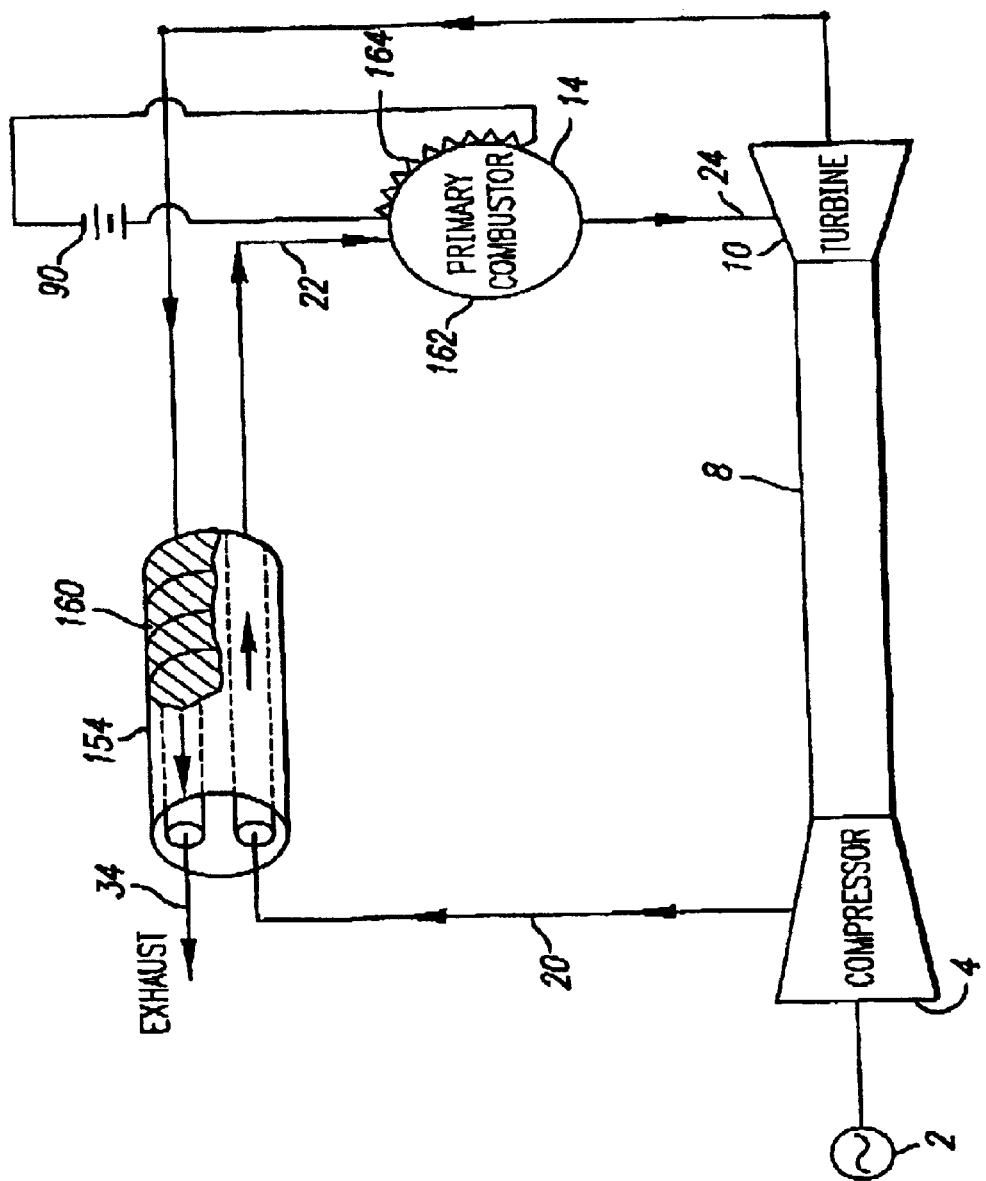
FIG. 10 is a block diagram illustration of an alternate exemplary turbogenerator system having a low pressure catalytic reactor integrated into a portion of a recuperator.

Referring now to FIG. 10, it illustrates a preferred unified recuperator/low pressure catalytic reactor 154 in which the portion of recuperator/low pressure catalytic reactor 154 containing low pressure catalytic reactor 160 is limited to less than the entire length of reactor 154 between the two gas inlets. Preferably, the portion of recuperator/low pressure catalytic reactor 154 containing low pressure catalytic reactor 160 is limited to the hot side of the recuperator/low pressure catalytic reactor 154, and more preferably to no more than thirty percent of the length of recuperator/low pressure reactor 154 on the hot side of recuperator/low pressure catalytic reactor 154.

In one embodiment, low pressure catalytic reactor 160 is restricted to a fraction of recuperator/low pressure catalytic reactor 154 into which flows the gas exhausted from turbine 10. In this region of higher temperature, low pressure catalytic reactor 160 performs more efficient conversion. Furthermore, positioning of low pressure catalytic reactor 160 in this region provides a greater opportunity for thermal energy generated in low pressure catalytic reactor 160 to be transferred to counter flowing gas proceeding through unified recuperator/low pressure catalytic reactor 154 toward primary combustor 162, which is preferably a catalytic reactor but may also be a flame-based reactor. Resistive electrical heater 164 powered by battery 90 may also be used to heat primary combustor 162.

Integrating low pressure catalytic reactor 160 into unified recuperator/low pressure catalytic reactor 154 in some instances is advantageous because it reduces the number of components and the quantity of materials required to build the system, decreasing system cost and complexity. It further avoids the need for additional housings, ducts and holders. Additionally, catalytic coating on unified recuperator/low pressure catalytic reactor 154 provides an oxidation barrier for the recuperator substrate that can increase the useful life of the recuperator. The integration of catalytic material into the recuperator can also increase heat exchange toward the end of the recuperator that would otherwise be colder. In systems having PID operational limitations imposed by the maximum operating temperature entering the recuperator, this configuration can permit increased thermal energy transfer in the recuperator by helping to equalize the temperature at a permissible level throughout the recuperator.

Integrated Catalytic Converters

Figure 11:
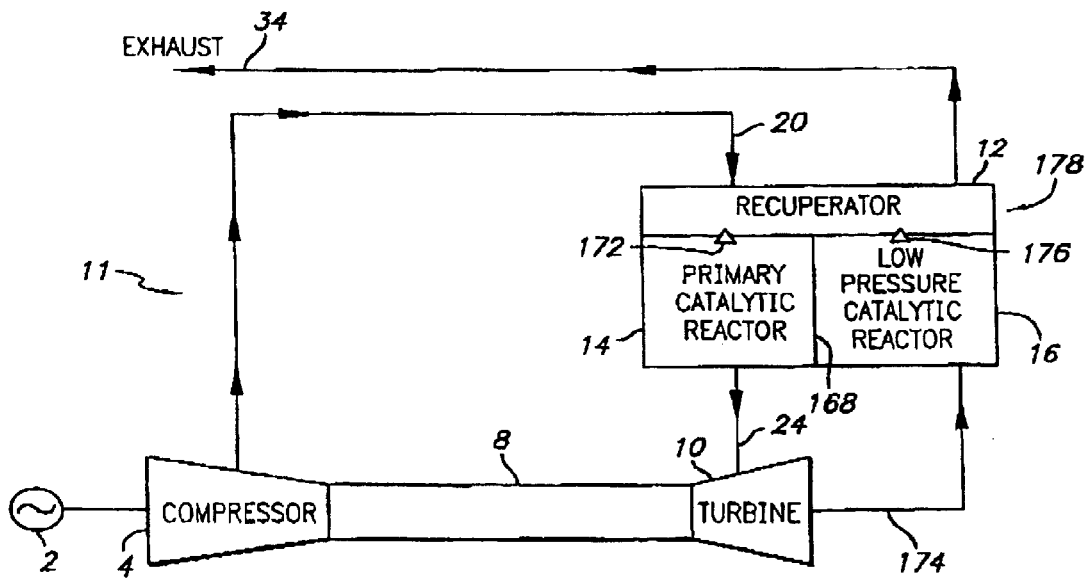
FIG. 11 is a block diagram illustration of an alternate exemplary integrated turbogenerator system having integrated high and low pressure catalytic reactors.

Referring now to FIG. 11, it illustrates an embodiment of system 11 containing dual integrated catalytic reactors. Primary catalytic converter 14 and low pressure catalytic converter 16 are positioned adjacent one another. Preferably the two converters physically contact each other for improved heat exchange, and in some embodiments the two converters share at least one common wall, such as common wall 168. In addition at least one of converters 14 or 16 can share a common wall with recuperator 12. In the illustrated embodiment, both converters 14 and 16 share a common wall with recuperator 12, together forming integrated conversion/recuperation unit 178. Gas from compressor 4 flows along line 20 into recuperator 12, where it is heated by counter flowing gas flowing into recuperator 12 from low pressure catalytic reactor 16. It then flows through valve 172 into primary catalytic reactor 14. Next it flows through line 24, and is expanded through turbine 10, before flowing along line 174 into low pressure catalytic reactor 16. Next, it flows through valve 176 into recuperator 12, from which it is exhausted along line 34. Integration of the two converters 14 and 16 with each other, as well as integration of the converters with recuperator 12, facilitates heat transfer between these system components.

Downstream Homogenous Gas Phase Reaction

In typical catalytic reactors, as much of the conversion reaction as possible occurs inside of the reactor itself. However, particularly in systems in which temperatures within the low pressure catalytic reactor approach or exceed the maximum permissible operating temperatures endurable by the reactor materials, it is desirable to employ a type of low pressure catalytic reactor that causes homogenous gas phase reaction to occur, in part, downstream of the reactor. Reactors having this capability are available from, among other sources, Catalytica, Inc. By shifting some of the thermal energy release downstream of the reactor, it is easier to maintain the maximum operating temperature of the reactor within material limitations. In one embodiment, the low pressure reactor is designed so that some conversion occurs in the reactor but any conversion that would cause the reactor temperature to closely approach or exceed the material limitations of the reactor occurs downstream of the reactor. One such low pressure reactor is designed so that substantial downstream conversion commences once sufficient conversion has occurred in the reactor that it reaches a predetermined temperature between approximately 1600° F. and 1800° F.

Reactor Optimization

The primary and low pressure catalytic reactors of the preferred system are ideally designed for operation in different, although potentially overlapping, temperature ranges. Catalytic reactors may be optimized for particular implementations by varying features including their volume, the residence time of gases in them, the number or volume of cells they contain, and catalyst loading on the surface of the reactor. The design of catalytic reactors is typically constrained by their maximum operating temperature, which they must be constructed to endure without catalyst volatilization. It is preferable to design reactors for dedicated operation in particular temperature ranges because of the inherent relationship between catalyst light-off and volatilization temperatures. Catalysts that become active in catalyzing at low temperatures also tend to volatilize at relatively low temperatures. Catalysts that do not become active until higher temperatures are reached also tend to volatilize at relatively high temperatures. In other words, different catalysts have different operating ranges, and catalytic reactors containing different catalytic have different ideal operating ranges.

In a preferred embodiment, the inlet temperature to primary catalytic reactor 14 is lower than the inlet temperature to low pressure catalytic reactor 16, but the outlet temperature to primary catalytic reactor 14 is higher than the outlet temperature to the low pressure catalytic reactor 16. This is possible because there is typically a smaller temperature gain within low pressure catalytic reactor 16 than within primary catalytic reactor 14. Because the maximum temperature in low pressure catalytic reactor 16 is lower than the maximum temperature in primary catalytic reactor 14, low pressure catalytic reactor 16 may be designed to light-off at a lower temperature than primary catalytic reactor 14. Furthermore, low pressure catalytic reactor 16 can be constructed from a less expensive material than primary catalytic reactor 14, such as an ordinary stainless steel or ceramic material.

The use of a low pressure catalytic reactor 16 optimized for low temperature operation can be especially advantageous during startup. A second reactor having a light-off temperature that is low relative to the light-off temperature of primary catalytic reactor 14 will begin the production of thermal energy at a far lower temperature than primary catalytic reactor 14, and can therefore expedite startup.

The volumes of the respective catalytic reactors are preferably optimized as well. The permissible volume of these reactors is limited by cost, size and functional constraints. It is desirable to select a volume for primary catalytic reactor 14 that is sufficient to combust some, but not all, of the fuel that enters it. The volume preferably is optimized so that during steady state operation the desired inlet temperature of the turbine 10 can be reached and maintained. Because of temperature-related limitations in turbine material, it is usually important not to exceed predetermined maximum turbine temperature. The volume of low pressure catalytic reactor 16 is preferably chosen to compliment the volume of primary catalytic reactor 14. Ideally in most cases, the volumes of the two reactors are chosen so that operating together they convert sufficient fuel and cleanup sufficient quantities of undesired reaction byproducts (for example, that they oxidize sufficient carbon monoxide) that the system complies with applicable environmental regulations. By the same token, the two volumes are preferably not be chosen so that their combination provides far more complete conversion than necessary, resulting in an unnecessarily bulky and expensive system.

Turbine operating temperature is preferably TIT (Turbine Inlet Temperature), which is a measure of the temperature of gas at the inlet to the turbine. However, it is often not practical to measure that TIT in which case the turbine operating temperature is preferably TET (Turbine Exhaust Temperature), which is a measure of the temperature of gas exiting the turbine.

Another benefit of using two catalytic reactors in a single system is the ability to increase efficiency by optimally allocating reactive work between primary catalytic reactor 14 and low pressure catalytic reactor 16. By harnessing the heat generated by low pressure catalytic reactor 16 to heat the gases flowing into primary catalytic reactor 14, the efficiency of primary catalytic reactor 14 can be raised. Typically, the efficiency of primary catalytic reactor 14 increases with increasing temperature but is constrained by the maximum operating temperature of turbine 10. Although energy from the low pressure catalytic reactor 16 is required to elevate the efficiency of primary catalytic reactor 14, in certain ranges the resultant increased output of primary catalytic reactor 14 more than offsets the energy siphoned from low pressure catalytic reactor 16. This is yet another respect in which the use of low pressure catalytic reactor 16 enhances efficiency. To most completely capitalize on this operational benefit of low pressure catalytic reactor 16, it is sometimes preferable to inject some fuel directly into low pressure catalytic reactor 16.

Two catalytic reactors may also be optimized to work efficiently together by selecting different catalysts for each. For example, platinum may be used as the catalyst in primary catalytic reactor 14 and palladium may be used as the catalyst in low pressure catalytic reactor 16. Using different catalysts increases the chances that fuel not converted in the presence of the first catalyst will be converted in the presence of the second catalyst.

System Design Methodology for Minimization of Multivariable Interactions

To facilitate final design optimization and troubleshooting of high-efficiency integrated turbogenerator systems subject to stringent emissions and efficiency requirements, it is necessary to optimize the simultaneous interoperation of a multitude of components. As discussed herein, properly incorporating a low pressure catalytic reactor into such a system can yield considerable operational benefits, but of course those benefits come at a cost of increased system complexity. A preferred methodology for finalizing the implementational details of such a system having a low pressure catalytic reactor is to first ensure that the system is operational without the low pressure catalytic reactor. After the foundational single catalytic reactor system is operational, its features should be optimized to the extent that operation of those features would not be materially impacted by the addition of a second catalytic reactor. Once the foundational system having a single catalytic reactor has been stabilized and initially optimized, the second reactor should be incorporated into the system and, as necessary, remaining optimization of the system and the second reactor may then be undertaken. This multi-step design and optimization methodology reduces the frequency with which developers would otherwise be required to identify and resolve troublesome multi-variable interactions between the low pressure catalytic reactor and other non-optimized components of the system. The foregoing incremental system development technique increases the pace and cost-effectiveness of engineering efforts required for the development of a particular implementation of the described dual-catalytic system.

Figure 12:
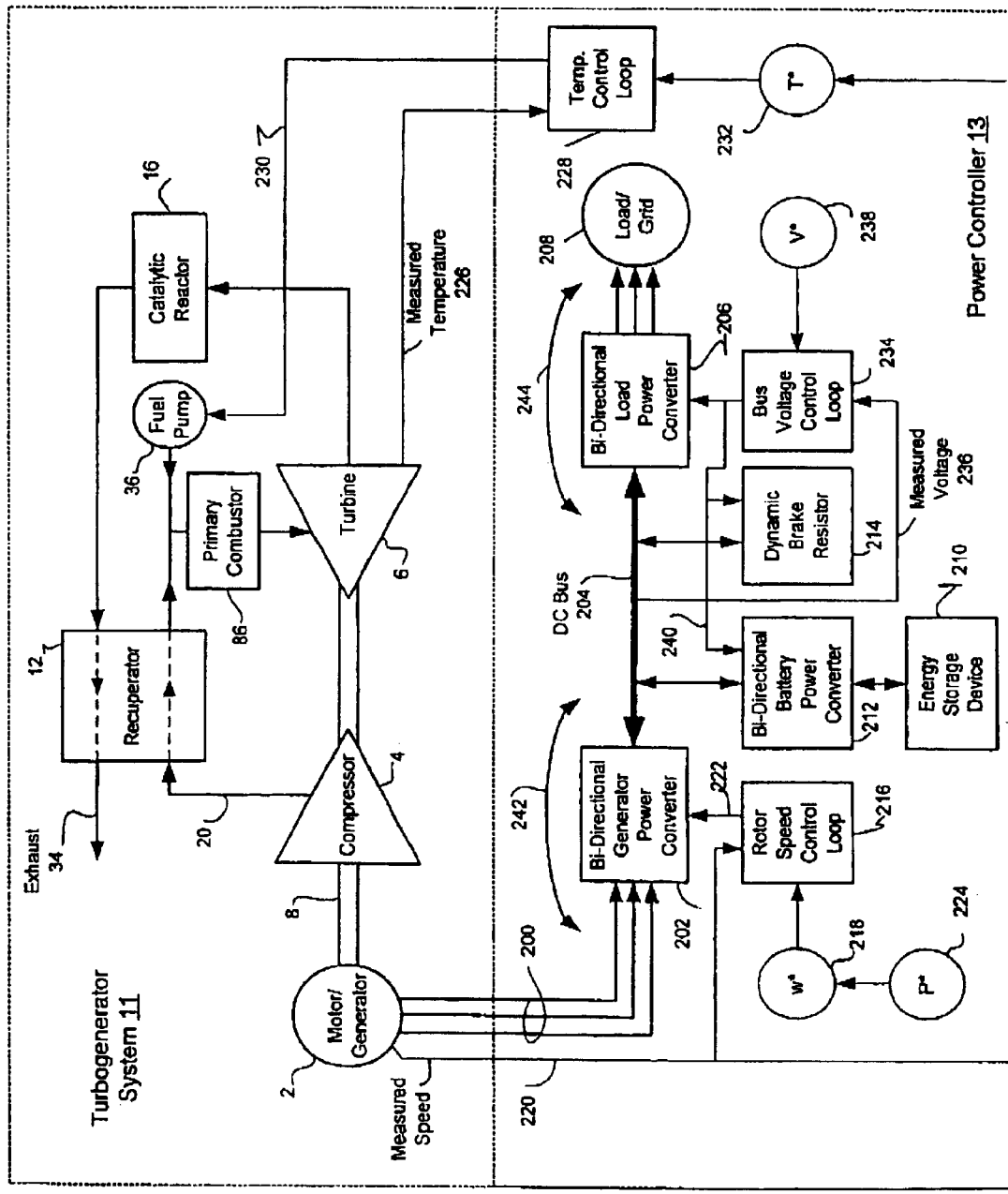
FIG. 12 is a block diagram schematic of a turbogenerator system including a power controller having decoupled rotor speed, operating temperature, and DC bus voltage control loops.

Referring now to FIG. 12, a preferred embodiment is shown in which an exemplar embodiment of integrated turbogenerator system 11 includes power controller 13 which has three substantially decoupled control loops for (1) engine or rotor speed, (2) temperature, and (3) DC bus voltage. A more detailed description of an appropriate power controller is disclosed in U.S. Pat. No. 6,487,096, and assigned to the assignee of the present application, which is incorporated herein in its entirety by reference thereto.

To facilitate the design and development of an efficient and useful integrated turbogenerator system, including a low pressure catalytic reactor as shown in the previous figures, it is necessary to optimize the simultaneous interaction of a multitude of components and systems. In particular, it is desirable to develop and utilize a power controller optimized for a low pressure catalytic reactor.

Conventional power controllers for turbogenerator systems were limited in their applications because of the interdependence of engine or rotor speed, operating temperature and DC bus voltage control loops. For example, a simple conventional power controller would include an inverter positioned between motor/generator, driven by the turbogenerator engine, and a DC bus used to power the load to which power was to be applied. In such a conventional system, the fuel supplied to the turbogenerator controlled the speed of the turbine engine and therefore the speed of the motor generator.

The AC output voltage of the motor/generator in a turbogenerator system as described herein is a direct function of engine speed because the rotor of the motor/generator is driven by the common shaft on which the compressor and turbine of the turbogenerator system are mounted. In conventional turbogenerator systems, the output of the motor/generator is rectified to apply DC to an intermediate bus from which power may be applied to a load. The DC bus voltage in such systems therefore varies as the speed of the turbine engine varies.

The turbine engine speed is often therefore controlled in such conventional systems in order to control the voltage of the DC bus. This control is achieved by controlling the fuel flow to the turbine engine. The operating temperature of a turbine engine is a function of fuel flow, so that speed, bus voltage and temperature are closely coupled in such conventional systems.

The present inventors recognized that the deployment of integrated turbine systems as described herein would be difficult or impossible to optimize using power controllers having tightly coupled speed, bus voltage and temperature control loops. The present inventors recognized that a practical product requires convenient characteristics at load conditions including start up, idle, light and medium loading as well as during transient conditions. With a conventional power control system, the reduced rotor speeds required for such non-full load conditions would result in low operating temperatures which could easily be below the operating temperatures necessary to maintain catalytic reactions in the low pressure catalytic reactor, and/or primary catalytic reactor, as described above.

In order to resolve this problem, the present inventors recognized the need for a power controller in which the operating temperature could be directly controlled. The inventors implemented a development plan to reduce development time and cost. The development plan included testing a lower pressure catalytic converter in an integrated turbine system including a flame based primary combustor such as primary combustor 86 shown in FIG. 12 to ensure its utility, and upon confirming its utility developing and testing an appropriate power controller for use with the flame based primary combustor, optimizing the use of the power controller with a catalytic reactor by using a catalytic reactor as the primary combustor, and then finalizing system design to including of a low pressure catalytic converter, and determining control parameter for the designed system.

Referring still to FIG. 12, integrated turbogenerator system 11 is combined with power controller 13 which includes three substantially independent or decoupled control loops for engine or rotor speed, temperature and DC bus voltage.

Integrated turbogenerator system 11 includes motor/generator 2 mounted for rotation with compressor 4 and turbine 6 on common shaft 8. Ambient air compressed in compressor 4 is applied via line 20 to recuperator 12 for heating by exhaust gas traveling towards exhaust line 34. The compressed and heated air is combined with fuel from fuel pump 36 and then applied to primary combustor 86, the exhaust gases from which are applied to turbine 6 to operate compressor 4 and motor/generator 2. After expansion in turbine 6, the exhaust gases are applied to low pressure catalytic reactor 16 before being applied to recuperator 12 as exhaust gas to heat the compressed air in line 20.

AC output 200 from motor/generator 2 is applied to bi-directional generator power converter 202, connected to DC bus 204, both in power controller 13. Generator power converter 202 includes a series of computer operable switches, such as IGBTs, which are selectively operated as an AC to DC converter to apply a selected amount of power from AC output 200 to DC bus 204 or as a DC to AC converter to apply a selected amount of power from DC bus 204 to generator power converter 202. Generator power converter 202 is therefore selectively operable to transfer power or current in and out of motor/generator 2 thereby changing the torque applied therefrom to common shaft 8.

DC power applied to DC bus 204 is applied by bi-directional load power converter 206, operating as a DC to AC converter, to load/grid 208. If load/grid 208 includes a source of energy, load power converter 206 may operate as an AC to DC or DC to DC converter to apply power from load/grid 208 to DC bus 204. In particular, load/grid 208 may be an AC utility grid from which power may also be applied from DC bus 204 via load power converter 206 when integrated turbogenerator system 11 is operated to support a utility grid. Load/grid 208 may be an AC or DC load when integrated turbogenerator system 11 is operated in a stand alone mode. Similarly, load/grid 208 may be a combination of an AC or DC load and a utility grid when integrated turbogenerator system 11 is operated in a UPS (Uninterruptable Power Supply) mode.

Power may also be applied to DC bus 204 from energy storage device 210 via bi-directional battery power converter 212 operating as a DC to DC converter. Similarly, for example, off loading power from DC bus 204 and/or for recharging energy storage device 210, battery power converter 212 may apply power from DC bus 204 to energy storage device 210.

Power may also be off loaded from DC bus 204 via dynamic brake resistor 214 connected thereto.

During operation of integrated turbogenerator system 11, the speed of common shaft 8 (and therefore the rotor speed of motor/generator 2 as well as the rotational or engine speed of both compressor 4 and turbine 6) is controlled by rotor speed control loop 216. Speed control loop 216 receives a speed command or speed set point W* from speed commander 218 as well as speed measurement 220 from motor/generator 2, compressor 4, turbine 6 or common shaft 8. Speed control loop 216 may preferably operate as a closed loop feedback control which applies the difference between speed command 218 and speed measurement 220 as speed error signal 222 as a control signal to generator power converter 202.

If speed error signal 222 indicates that rotor speed should be reduced, generator power converter 202 increases the amount of power applied from motor/generator 2 via AC output 200 to DC bus 204 increasing the load on motor/generator 2 which increases the torque load on common shaft 8, which reduces the speed of common shaft 8 and therefor reduces rotor speed. If speed error signal 222 indicates that rotor speed should be increased, generator power converter 202 decreases the amount of power applied from motor/generator 2 via AC output 200 to DC bus 204 decreasing the load on motor/generator 2 which decreases the torque load on common shaft 8. This increases rotor speed because the rotational forces applied by the exhaust gases from primary combustor 86 to turbine 6 have not changed so that a decrease in torque load on common shaft 8 results in an increase in speed for common shaft 8.

Similarly if speed error signal 222 indicates that rotor speed should be reduced, the amount of power applied from motor/generator 2 via AC output 200 to DC bus 204 can be increased, to increase the torque load on motor/generator 2. This can be accomplished (1) by increasing the load on DC bus 204 by appropriate modulation of brake resistor 214, (2) by operation of battery power converter 212 to apply power from DC bus 204 to energy storage device 210, and/or (3) by increasing the power applied by load power converter 206 to load/grid 208.

If speed error signal 222 indicates that rotor speed should be increased, power from DC bus 204 may be applied to motor/generator 2 to operate motor/generator 2 as a motor.

For example, at start up, shut down or during other transient conditions when the rotational power applied to common shaft 8 from the exhaust gases of primary combustor 86 is not sufficient to achieve or maintain the desired speed specified by speed command 218, it may be advantageous to continue the rotation of common shaft 8 at the specified speed by applying power from DC bus 204 via generator power converter 202 to motor/generator 2.

In a preferred embodiment, speed command 218 receives as its input power command 224 which may be provided from a user selected power command and/or a measurement or other indication of the power being applied or to be applied by load power converter 206 to load/grid 208. In this manner, the rotor speed of integrated turbogenerator system 11 is maintained in a closed loop feedback control in accordance with the power being, or to be provided, to the load.

During operation of integrated turbogenerator system 11, the operating temperature 226 of turbine 6, often measured as the turbine exhaust temperature or TET, is applied as an input to temperature feedback control loop 228 where it is compared with a temperature set point, such as commanded temperature T* received from temperature commander 232, to generate set point temperature error or control signal 230 which is applied to fuel pump 36. In this way, the operating temperature of integrated turbogenerator system 11 may be regulated or controlled to a predetermined temperature by adjusting the fuel supplied to primary combustor 86 substantially if not completely decoupling operating temperature from turbine speed. The operating temperature may therefore be selected and maintained to optimize the operations of primary combustor 86 and/or low pressure catalytic reactor 16 without undesirable impact on actual rotor speed.

Although fuel flow adjustment is conventionally perceived as technique for adjusting operating speed with temperature as a direct function of fuel flow and therefore speed, integrated turbogenerator system 11 advantageously decouples speed and temperature by controlling speed to a value selected in accordance with the power to be provided and by separately controlling temperature to a value selected for optimized performance. This technique permits the operation of integrated turbogenerator system 11 at an optimized temperature and an optimized speed at many operating conditions in addition to full load, such as start up, shut down and other transient conditions.

It has also been determined that the preselected operating temperatures may be advantageously different for different operating speeds. For example, it may be advantageous to select and maintain an operating temperature or temperatures for start up, shut down and transient response that are different, typically lower, than the operating temperature selected and maintain under full load conditions. Speed measurement 220 may conveniently be applied to as an input to temperature commander 232 so that the regulated operating temperature may be selected in accordance with rotor speed or rotor speed ranges.

It is important to note that the use of speed measurement 220 in selecting the commanded temperature T* does not have the same result as adjusting the fuel flow to control speed. In integrated turbogenerator system integrated turbogenerator system 11, the temperature is maintain at values chosen by design for various operating conditions while speed is controlled to a value selected in accordance with power.

Under some operating conditions, the decoupled speed and temperature control loops of integrated turbogenerator system 11 may well result in a situation in which the fuel flow provided by fuel pump 36 to primary combustor 86 results in the production of more exhaust gas being applied to turbine 6 than is required for the desired rotor speed. In this situation, excess drag or torque then may be applied by rotor speed control loop 216 to common shaft 8 beyond what is required by motor/generator 2 to produce the amount of AC output 200 required at that time by DC bus 204. Although some minor levels of efficiency may be lost under such conditions, these are transient conditions lasting a relatively short amount of time so that the overall efficiency of integrated turbogenerator system 11 remains extremely high while providing reliable operation over a relatively wide range of operating speeds.

Under the above described conditions, as well other transient conditions, it is important to maintain the voltage of DC bus 204 at a controlled and constant value. The control of the DC bus voltage 236 is provided by a further control loop, DC bus voltage control loop 234, which is substantially decoupled from the above described speed and temperature control loops.

During operation of integrated turbogenerator system 11, DC bus voltage control loop 234 receives measured bus voltage 236 as an input. Measured bus voltage 236 is compared to preselected or commanded DC bus voltage V* provide by voltage commander 238 in DC bus voltage control loop 234 to generate voltage error or voltage control signal 240 which may be applied to battery power converter 212, brake resistor 214 and/or load power converter 206. If measured bus voltage 236 begins to droop, the amount of power being removed from DC bus 204 for application to load/grid 208 may be reduced by operation of load power converter 206 and/or power may be applied from load/grid 208 if an energy source is included therein, in order to prevent droop. Further, power may be applied to DC bus 204 from energy storage device 210 under the direction of battery power converter 212 to prevent droop. If measured bus voltage 236 begins to exceed commanded DC bus voltage V*, power may be removed from DC bus 204 to limit the voltage increase by applying more power to DC bus 204 from load/grid 208 under the control of load power converter 206, or by applying power to energy storage device 210 under the control of battery power converter 212, and/or by dissipating excess power in brake resistor 214 which may be modulated on and off under the control of DC bus voltage control loop 234.

In summary, the advantageous topology of power controller 13 for use in integrated turbogenerator system 11, as shown for example in FIG. 12, includes three decoupled or independent control loops in which temperature is regulated to a set point by varying fuel flow, power or current is added to or removed from motor/generator 2 under control of generator power converter 202 to control rotor speed to a set point, as indicated by bi-directional arrow 242, and bus voltage is controlled to a set point generally as indicated by bi-directional arrow 244 by applying or removing power from DC bus 204 under the control of load power converter 206 as well as from energy storage device 210 under the control of battery power converter 212. Power may also be removed from DC bus 204 by modulating the application of dynamic brake resistor 214 across DC bus 204.

As may be noted from the above description, the perfection of the speed, temperature and voltage control systems described above by first testing and development of a system using a flame combustor as primary combustor 86, and then with a catalytic reactor as primary combustor 86, and finally by reintroducing low pressure low pressure catalytic reactor 16, enabled the development of a robust, practical and efficient product topology which may easily be adjusted for many differing operating conditions and uses.

A further advantage of the use of the integrated turbogenerator system topology shown in FIG. 12, when using a catalytic reactor as primary combustor 86, especially during transient conditions such as start up, is that any excess unburned hydrocarbons in the exhaust of the primary combustor 86 due to the excess of fuel resulting from the decoupling of the fuel or temperature control loops from speed and voltage control, is automatically eliminated by low pressure low pressure catalytic reactor 16. Similarly, the various other topologies and combinations for integrated turbogenerator system 11 presented above each may have specific additional advantages under particular fuel, ambient, transient and power conditions.

Having now described the invention in accordance with the requirements of the patent statutes, those skilled in this art will understand how to make changes and modifications in the present invention to meet their specific requirements or conditions. Such changes and modifications may be made without departing from the scope and spirit of the invention as set forth in the following claims.

What is claimed is:

1. A turbogenerator system, comprising:
    a turbine;
    a compressor;
    a motor/generator;
    a common shaft on which the turbine, compressor and motor/generator are mounted for rotation;
    a primary combustor downstream of said compressor, said primary combustor having an exhaust gas outlet applied to the turbine to rotate the common shaft, the compressor and motor/generator, said primary combustor being a flame combustor;
    a source of fuel for providing fuel to the primary combustor;
    a catalytic reactor downstream of said turbine for reducing unburned hydrocarbons in said exhaust gases;
    a recuperator for transferring heat from said exhaust gases to compressed gas applied by said compressor to said primary combustor;
    a DC bus connected between said motor/generator and a load; and
    a power controller for independently controlling a speed of said common shaft, an operating temperature of said turbogenerator and a voltage on said DC bus, wherein said power controller further comprises:
    a bi-directional generator power converter connected between said motor/generator and said DC bus for converting AC power from said motor/generator for application to said DC bus and for converting DC power from said DC bus for application to said motor/generator; and
    a speed control loop responsive to a measured value related to a rotational speed of said common shaft and the turbine, compressor and motor/generator mounted thereon for controlling said rotational speed at a predetermined speed set point by operating said bi-directional generator power converter to apply power from said motor/generator to said DC bus and from said DC bus to said motor/generator.

2. The turbogenerator system of claim 1 wherein said compressor compresses air which is applied, together with fuel from said source of fuel, to said primary combustor.

3. The turbogenerator system of claim 1 wherein said compressor receives fuel from said source of fuel which is compressed together with air in said compressor to form a compressed air fuel mixture applied to said primary combustor.

4. The turbogenerator system of claim 1 wherein said primary combustor is a second catalytic reactor.

5. The turbogenerator system of claim 1 wherein said compressor compresses air which is applied, together with fuel from said source of fuel, to said primary combustor.

6. The turbogenerator system of claim 1 wherein said compressor receives fuel from said source of fuel which is compressed together with air in said compressor to form a compressed air fuel mixture applied to said primary combustor.

7. The turbogenerator system of claim 1 wherein said speed control loop is responsive to a value of power applied to the load for determining said speed set point.

8. The turbogenerator system of claim 1 wherein said power controller further comprises:
    a temperature control loop responsive to a measured operating temperature of said turbogenerator system for controlling said operating temperature to a predetermined temperature set point by controlling the flow of fuel from said fuel source to said primary combustor.

9. The turbogenerator of claim 1 wherein said temperature control loop is responsive to said rotational speed for determining said temperature set point.

10. The turbogenerator system of claim 1 wherein said power controller further comprises:
   a bi-directional load power converter connected between said DC bus and said load for converting DC power from DC bus for application to said load and for converting power from said load to said DC bus;
   a bus voltage control loop responsive to a measured value related to a voltage of said DC bus for controlling said voltage at a predetermined voltage set point by applying power from said DC bus to said load and from said load to said DC bus.

11. The turbogenerator system of claim 1 further comprising:
   a dynamic brake resistor selectively applied by said bus voltage control loop to said DC bus to remove power therefrom.

12. The turbogenerator system of claim 1 further comprising:
   an energy storage device; and
   a bi-directional battery power converter responsive to said bus voltage control loop for selectively applying power from said energy storage device to said DC bus and from said DC bus to said energy storage device.

* * * * *